United States Patent
Yan et al.

(10) Patent No.: US 12,481,207 B2
(45) Date of Patent: Nov. 25, 2025

(54) LASER SOURCE AND LASER PROJECTION APPARATUS

(71) Applicant: HISENSE LASER DISPLAY CO., LTD, Shandong (CN)

(72) Inventors: Ke Yan, Shandong (CN); Wei Li, Shandong (CN); Youliang Tian, Shandong (CN)

(73) Assignee: HISENSE LASER DISPLAY CO., LTD, Qingdao (CN)

( * ) Notice: Subject to any disclaimer, the term of this patent is extended or adjusted under 35 U.S.C. 154(b) by 384 days.

(21) Appl. No.: 18/198,715

(22) Filed: May 17, 2023

(65) Prior Publication Data
US 2023/0314921 A1 Oct. 5, 2023

Related U.S. Application Data

(63) Continuation of application No. PCT/CN2022/077331, filed on Feb. 22, 2022.

(30) Foreign Application Priority Data

Feb. 22, 2021 (CN) .......................... 202110199371.7
Feb. 22, 2021 (CN) .......................... 202110199377.4
Mar. 31, 2021 (CN) .......................... 202110351962.1

(51) Int. Cl.
*G03B 21/20* (2006.01)

(52) U.S. Cl.
CPC ..... *G03B 21/2033* (2013.01); *G03B 21/2013* (2013.01); *G03B 21/2066* (2013.01); *G03B 21/208* (2013.01)

(58) Field of Classification Search
CPC ............ G03B 21/2033; G03B 21/2013; G03B 21/2066; G03B 21/208; G03B 21/14; G03B 21/20
See application file for complete search history.

(56) References Cited

U.S. PATENT DOCUMENTS

11,275,253 B2 * 3/2022 Li .......................... G02B 26/06
11,333,963 B2 * 5/2022 Lin ....................... G03B 21/208
(Continued)

FOREIGN PATENT DOCUMENTS

CN 104503098 A 4/2015
CN 210534521 U 5/2020
(Continued)

OTHER PUBLICATIONS

International Search Report and Written Opinion dated Apr. 28, 2022 in corresponding International Application No. PCT/CN2022/077331, translated, 23 pages.
(Continued)

*Primary Examiner* — Bao-Luan Q Le
(74) *Attorney, Agent, or Firm* — MH2 TECHNOLOGY LAW GROUP LLP

(57) ABSTRACT

A laser source includes a laser device, a combining lens group, and a beam spot angle guiding component. The laser device includes a first laser device and a second laser device. The first laser device is configured to emit a first type laser beam and a second type laser beam. The second laser device is configured to emit the second type laser beam. The combining lens group includes a first combining lens group and a second combining lens group. The first combining lens group is configured to emit the laser beams emitted by the first laser device in a first direction. The second combining lens group is configured to reflect the laser beam. The beam spot angle guiding component is configured to change a divergence angle of at least one of the first type laser beam or the second type laser beam.

20 Claims, 11 Drawing Sheets

(56) References Cited

U.S. PATENT DOCUMENTS

| | | | |
|---|---|---|---|
| 11,385,535 B2* | 7/2022 | Kurita | G03B 21/2033 |
| 11,442,351 B2* | 9/2022 | Lin | G02B 27/141 |
| 11,490,059 B2* | 11/2022 | Narita | G02B 27/18 |
| 12,332,559 B2* | 6/2025 | Lin | G03B 21/2066 |
| 2009/0161072 A1 | 6/2009 | Yamauchi et al. | |
| 2014/0354956 A1 | 12/2014 | Yamada et al. | |
| 2017/0339378 A1 | 11/2017 | Okumura | |
| 2020/0301263 A1* | 9/2020 | Li | G03B 21/008 |
| 2021/0191250 A1* | 6/2021 | Kurita | G03B 33/12 |
| 2021/0286248 A1* | 9/2021 | Lin | G02B 27/1006 |
| 2021/0314537 A1* | 10/2021 | Narita | G02B 19/0028 |
| 2021/0341824 A1* | 11/2021 | Lin | G03B 21/2073 |
| 2022/0373874 A1* | 11/2022 | Lin | G03B 21/2066 |

FOREIGN PATENT DOCUMENTS

| | | |
|---|---|---|
| CN | 210954574 U | 7/2020 |
| CN | 111562713 A | 8/2020 |
| CN | 111947592 A | 11/2020 |
| CN | 212276207 U | 1/2021 |
| CN | 112987471 A | 6/2021 |
| CN | 112987472 A | 6/2021 |

OTHER PUBLICATIONS

Chinese First Office Action dated Dec. 15, 2021 in corresponding Chinese Application No. 202110199371.7, translated, 18 pages.
Chinese Second Office Action dated Jun. 7, 2022 in corresponding Chinese Application No. 202110199371.7, translated, 18 pages.
Chinese Decision of Rejection dated Nov. 3, 2022 in corresponding Chinese Application No. 202110199371.7, translated, 16 pages.
Chinese First Office Action dated Dec. 15, 2021 in corresponding Chinese Application No. 202110199377.4, translated, 17 pages.
Chinese Second Office Action dated Jun. 7, 2022 in corresponding Chinese Application No. 202110199377.4, translated, 17 pages.
Chinese Decision of Rejection dated Nov. 8, 2022 in corresponding Chinese Application No. 202110199377.4, translated, 15 pages.

* cited by examiner

LASER SOURCE AND LASER PROJECTION APPARATUS

CROSS-REFERENCE TO RELATED APPLICATIONS

This application is a continuation application of International Patent Application No. PCT/CN2022/077331, filed on Feb. 22, 2022, pending, which claims priority to Chinese Patent Application No. 202110199377.4, filed on Feb. 22, 2021; Chinese Patent Application No. 202110199371.7, filed on Feb. 22, 2021; and Chinese Patent Application No. 202110351962.1, filed on Mar. 31, 2021, which are incorporated herein by reference in their entireties.

TECHNICAL FIELD

The present disclosure relates to the field of laser projection technologies, and in particular, to a laser source and a laser projection apparatus.

BACKGROUND

With the development of laser projection technologies, consumers have more and more demands on the projection effect of laser projection apparatuses. Laser sources are increasingly used in the laser projection apparatuses due to their characteristics of high luminance, long service life, small volume, and low power consumption.

SUMMARY

In an aspect, a laser source is provided. The laser source includes a laser device, a combining lens group, and a beam spot angle guiding component. The laser device includes a first laser device and a second laser device. The first laser device is configured to emit a first type laser beam and a second type laser beam. The second laser device is configured to emit at least the second type laser beam. The combining lens group includes a first combining lens group and a second combining lens group. The first combining lens group is configured to combine the laser beams emitted by the first laser device and propagate the combined laser beams in a first direction. The second combining lens group is configured to reflect the second type laser beam emitted by the second laser device in the first direction. On a plane perpendicular to the first direction, an orthogonal projection of a beam spot provided by the first type laser beam on the first combining lens group is smaller than an orthogonal projection of a beam spot provided by the second type laser beam on the first combining lens group. The beam spot angle guiding component is configured to change a divergence angle of at least one of the first type laser beam or the second type laser beam, so as to improve coincidence degree and color uniformity of the beam spot of the first type laser beam and the beam spot of the second type laser beam incident on the combining lens group.

In another aspect, a laser source is provided. The laser source includes a laser device, a combining lens group, and a polarization direction changing structure. The laser device includes a first laser device and a second laser device. The first laser device is configured to emit a first type laser beam and a second type laser beam. The second laser device is configured to emit the second type laser beam. The combining lens group includes a first combining lens group and a second combining lens group. The first combining lens group is configured to combine the laser beams emitted by the first laser device and propagate the combined laser beams in a first direction. The second combining lens group is configured to reflect the second type laser beam from the second laser device in the first direction and transmit the first type laser beam and the second type laser beam from the first combining lens group. The polarization direction changing structure is configured to change a polarization direction of at least one of the first type laser beam or the second type laser beam, so as to make a beam path of the second type laser beam emitted by the first laser device overlap with a beam path of the second type laser beam emitted by the second laser device. On a plane perpendicular to the first direction, an orthogonal projection of a beam spot provided by the first type laser beam on the first combining lens group is smaller than an orthogonal projection of a beam spot provided by the second type laser beam on the first combining lens group. In the laser beams incident on the second combining lens group, the polarization directions of the first type laser beam and the second type laser beam from the first laser device are same, and the polarization directions of the first type laser beam and the second type laser beam from the first laser device are perpendicular to the polarization direction of the second type laser beam from the second laser device. On the second combining lens group, a beam spot provided by the first type laser beam and the second type laser beam from the first laser device overlaps with a beam spot provided by the second type laser beam from the second laser device.

In yet another aspect, a laser projection apparatus is provided. The laser projection apparatus includes the above laser source, a light modulator, and a projection lens. The laser source is configured to emit laser beams. The light modulator is configured to modulate the laser beams incident on the light modulator according to an image signal, so as to obtain projection beams. The projection lens is configured to project the projection beams to provide a projection image.

BRIEF DESCRIPTION OF THE DRAWINGS

In order to describe the technical solutions in the present disclosure more clearly, accompanying drawings to be used in some embodiments of the present disclosure will be introduced briefly below. However, the accompanying drawings to be described below are merely accompanying drawings of some embodiments of the present disclosure, and a person of ordinary skill in the art may obtain other drawings according to these drawings.

In addition, the accompanying drawings to be described below may be regarded as schematic diagrams but are not limitations on an actual size of a product, an actual process of a method and an actual timing of a signal involved in the embodiments of the present disclosure.

DETAILED DESCRIPTION

Figure 1:
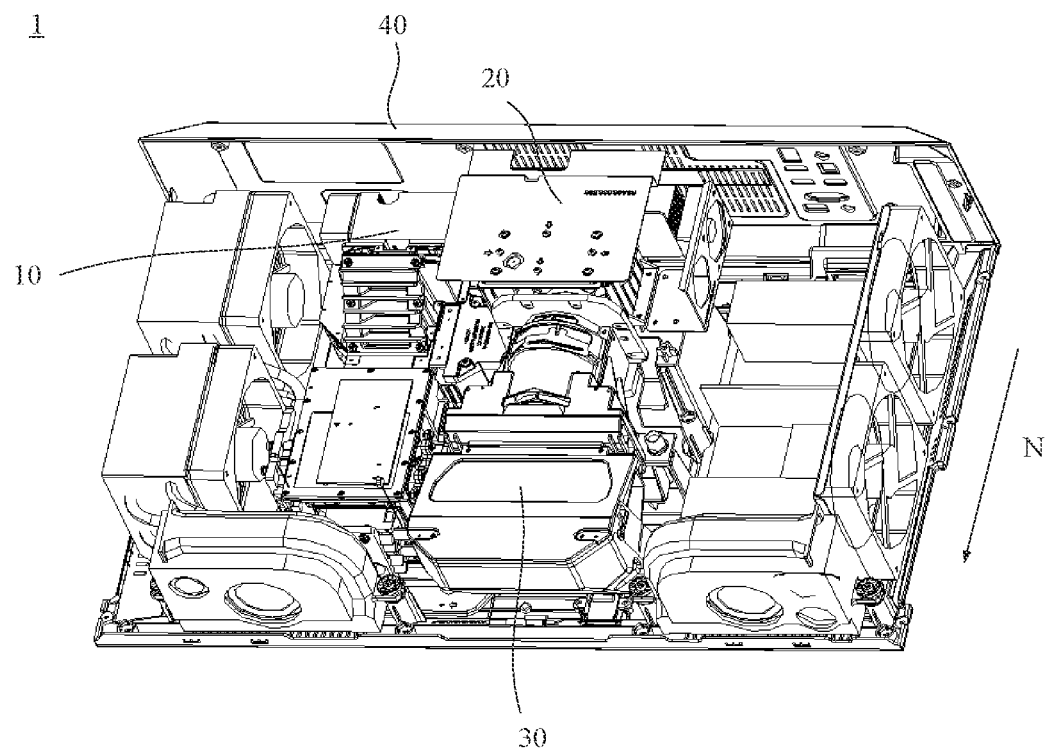
FIG. 1 is a diagram showing a structure of a laser projection apparatus, in accordance with some embodiments.

Some embodiments of the present disclosure will be clearly and completely described below with reference to the accompanying drawings. However, the described embodiments are merely some but not all embodiments of the present disclosure. All other embodiments obtained by a person of ordinary skill in the art based on embodiments of the present disclosure shall be included in the protection scope of the present disclosure.

Unless the context requires otherwise, throughout the specification and the claims, the term "comprise" and other forms thereof such as the third-person singular form "comprises" and the present participle form "comprising" are construed as an open and inclusive meaning, i.e., "including, but not limited to." In the description of the specification, the terms such as "one embodiment," "some embodiments," "exemplary embodiments," "example," "specific example," or "some examples" are intended to indicate that specific features, structures, materials, or characteristics related to the embodiment(s) or example(s) are included in at least one embodiment or example of the present disclosure. Schematic representations of the above terms do not necessarily refer to the same embodiment(s) or example(s). In addition, the specific features, structures, materials, or characteristics may be included in any one or more embodiments or examples in any suitable manner.

Hereinafter, the terms such as "first" and "second" are used for descriptive purposes only and are not to be construed as indicating or implying the relative importance or implicitly indicating the number of indicated technical features. Thus, features defined by "first" or "second" may explicitly or implicitly include one or more of the features. In the description of the embodiments of the present disclosure, the term "a plurality of" or "the plurality of" means two or more unless otherwise specified.

In the description of some embodiments, the terms "coupled," "connected," and derivatives thereof may be used. The term "connected" should be understood in a broad sense. For example, the term "connected" may represent a fixed connection, a detachable connection, or a one-piece connection, or may represent a direct connection, or may represent an indirect connection through an intermediate medium. The embodiments disclosed herein are not necessarily limited to the content herein.

The phrase "at least one of A, B and C" has the same meaning as the phrase "at least one of A, B or C," both including the following combinations of A, B and C: only A, only B, only C, a combination of A and B, a combination of A and C, a combination of B and C, and a combination of A, B and C.

The phrase "A and/or B" includes the following three combinations: only A, only B, and a combination of A and B.

The use of the phase "applicable to" or "configured to" herein means an open and inclusive expression, which does not exclude devices that are applicable to or configured to perform additional tasks or steps.

The term such as "about," "substantially," and "approximately" as used herein includes a stated value and an average value within an acceptable range of deviation of a particular value. The acceptable range of deviation is determined by a person of ordinary skill in the art, considering measurement in question and errors associated with measurement of a particular quantity (i.e., limitations of a measurement system).

The term such as "parallel," "perpendicular," or "equal" as used herein includes a stated condition and a condition similar to the stated condition. A range of the similar condition is within an acceptable deviation range, and the acceptable deviation range is determined by a person of ordinary skill in the art, considering measurement in question and errors associated with measurement of a particular quantity (i.e., the limitations of a measurement system). For example, the term "parallel" includes absolute parallelism and approximate parallelism, and an acceptable deviation range of the approximate parallelism may be, for example, a deviation within 5°. The term "perpendicular" includes absolute perpendicularity and approximate perpendicularity, and an acceptable deviation range of the approximate perpendicularity may also be, for example, a deviation within 5°. The term "equal" includes absolute equality and approximate equality, and an acceptable deviation range of the approximate equality may be that, for example, a difference between the two that are equal is less than or equal to 5% of either of the two.

FIG. 1 is a diagram showing a structure of a laser projection apparatus, in accordance with some embodiments.

In some embodiments of the present disclosure, a laser projection apparatus 1 is provided.

As shown in FIG. 1, the laser projection apparatus 1 includes an apparatus housing 40 (only a portion of the apparatus housing 40 being shown in FIG. 1), and a laser source 10, a light modulator 20 and a projection lens 30 assembled in the apparatus housing 40. The laser source 10 is configured to provide illumination beams (e.g., laser beams). The light modulator 20 is configured to modulate the illumination beams provided by the laser source 10 with image signals, so as to obtain projection beams. The projection lens 30 is configured to project the projection beams into an image on a screen or a wall.

The laser source 10, the light modulator 20, and the projection lens 30 are sequentially connected in a propagation direction of the beams and are each wrapped by a corresponding housing. The housings of the laser source 10, the light modulator 20 and the projection lens 30 support their corresponding optical components, respectively, and make the optical components meet certain sealing or airtight requirements.

Figure 2:
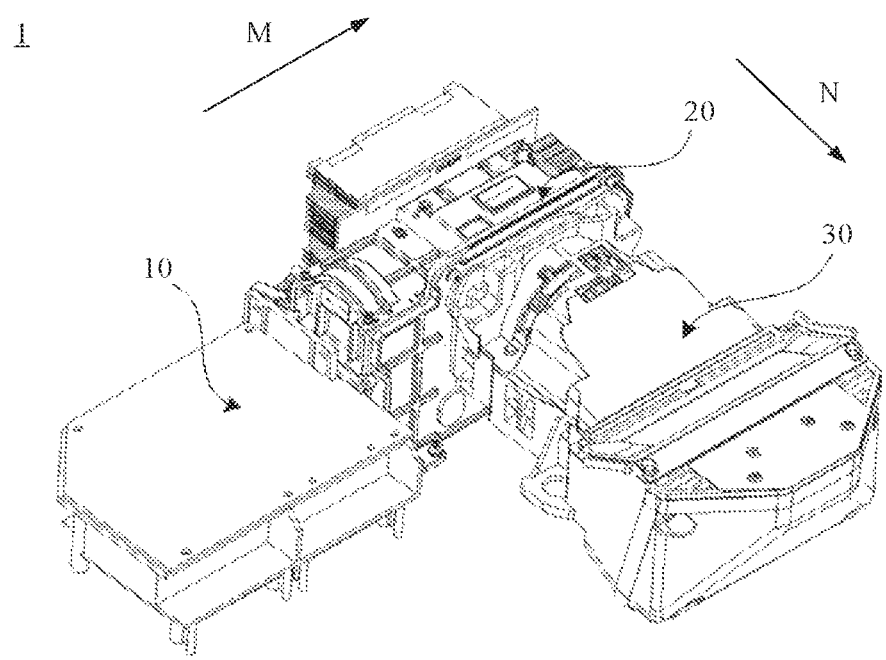
FIG. 2 is a diagram showing a partial structure of a laser projection apparatus, in accordance with some embodiments.

FIG. 2 is a diagram showing a partial structure of a laser projection apparatus, in accordance with some embodiments.

As shown in FIG. 2, an end of the light modulator 20 is connected to the laser source 10, and the laser source 10 and the light modulator 20 are arranged in an exit direction of the illumination beams of the laser projection apparatus 1 (referring to the M direction shown in FIG. 2). Another end of the light modulator 20 is connected to the projection lens 30, and the light modulator 20 and the projection lens 30 are arranged in an exit direction of the projection beams of the laser projection apparatus 1 (referring to the N direction shown in FIG. 2). The exit direction of the illumination beams is substantially perpendicular to the exit direction of the projection beams. In one aspect, such a connection structure may adapt to characteristics of a beam path of a reflective light valve in the light modulator 20, and in another aspect, it is also conducive to shortening a length of a beam path in a one-dimensional direction, which is helpful for structural arrangement of the apparatus. For example, in a case where the laser source 10, the light modulator 20, and the projection lens 30 are disposed in the one-dimension direction (e.g., the M direction), a length of a beam path in the one-dimensional direction is long, which is not conducive to the structural arrangement of the apparatus. The reflective light valve will be described below.

In some embodiments, the laser source 10 may provide beams of three primary colors sequentially (beams of other colors may also be added on a basis of the beams of three primary colors). However, due to a phenomenon of visual persistence of human eyes, what the human eyes see is white beams formed by mixing the beams of three primary colors. Alternatively, the laser source 10 may also simultaneously output the beams of three primary colors, so as to continuously emit white beams. The laser source 10 includes a laser device. The laser device may emit laser beams of at least one color, such as red laser beams, blue laser beams, or green laser beams.

Figure 3A:
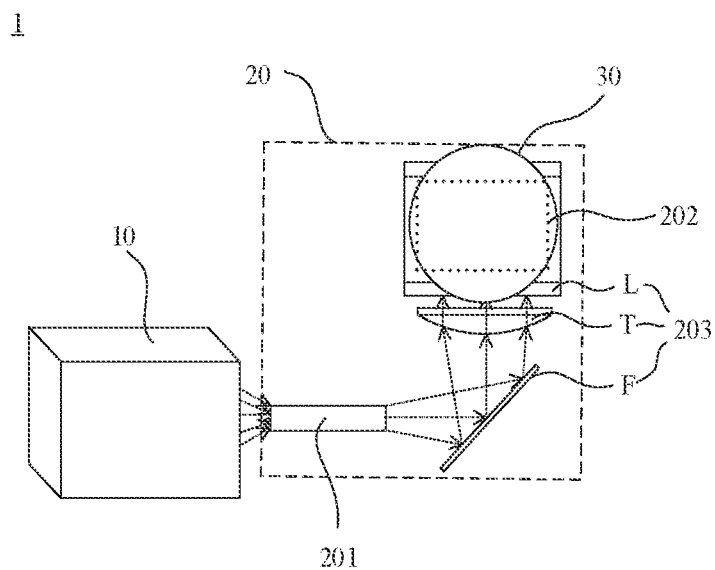
FIG. 3A is a diagram showing a beam path of a laser source, a light modulator, and a projection lens in a laser projection apparatus, in accordance with some embodiments.
Figure 3B:
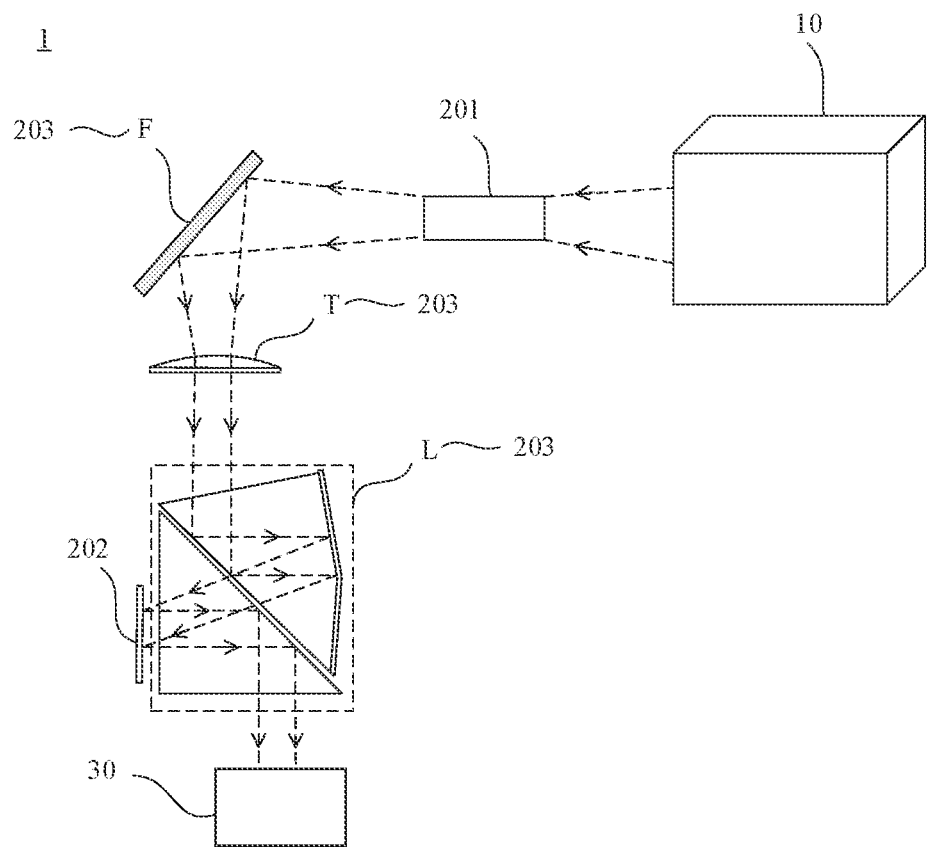
FIG. 3B is a diagram showing another beam path of a laser source, a light modulator, and a projection lens in a laser projection apparatus, in accordance with some embodiments.

FIG. 3A is a diagram showing a beam path of a laser source, a light modulator, and a projection lens in a laser projection apparatus, in accordance with some embodiments. FIG. 3B is a diagram showing another beam path of a laser source, a light modulator, and a projection lens in a laser projection apparatus, in accordance with some embodiments.

The illumination beams emitted by the laser source 10 enter the light modulator 20. Referring to FIGS. 3A and 3B, the light modulator 20 includes a light homogenizing component 201 and a light valve 202. The light homogenizing component 201 may homogenize the incident laser beams and then propagate the homogenized laser beams to the light valve 202. The light valve 202 may modulate the incident laser beams and then propagate the modulated laser beams to the projection lens 30.

In some embodiments, as shown in FIGS. 3A and 3B, the light homogenizing component 201 includes a light pipe. The light pipe may receive the illumination beams provided by the laser source 10 and homogenize the illumination beams. In addition, a beam outlet of the light pipe may be in a shape of a rectangle, so as to have a shaping effect on a beam spot.

In some embodiments, the light homogenizing component 201 may also be a fly-eye lens.

In some embodiments, the light valve 202 may include a plurality of reflective plates, and each of the reflective plates may be used to form a pixel in the projection image. The light valve 202 may adjust the plurality of reflective plates according to an image to be displayed, so that the reflective plates corresponding to the pixels of the image that need to be displayed in a bright state reflect the laser beams to the projection lens 30, so as to achieve the modulation of the illumination beams.

Figure 4:
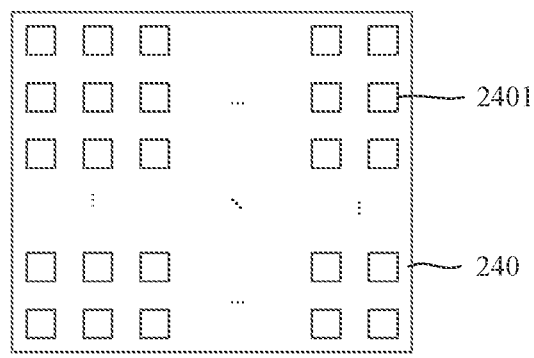
FIG. 4 is a diagram showing an arrangement of micromirrors in a digital micromirror device, in accordance with some embodiments.
Figure 5:
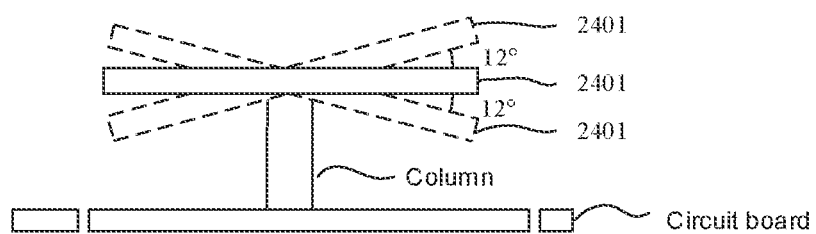
FIG. 5 is a diagram showing a swing position of a micromirror in the digital micromirror device shown in FIG. 4.

FIG. 4 is a diagram showing an arrangement of micromirrors in a digital micromirror device, in accordance with some embodiments. FIG. 5 is a diagram showing a swing position of a micromirror in the digital micromirror device shown in FIG. 4.

For example, the light valve 202 is a digital micromirror device (DMD) 240. The digital micromirror device 240 modulates the illumination beams provided by the laser source 10 through the image signals. That is, the digital micromirror device 240 controls the projection beams to display different luminance and gray scales according to different pixels in the image to be displayed, so as to finally produce an optical image. As shown in FIG. 4, the digital micromirror device 240 includes thousands of micromirrors 2401 that may be individually driven. These micromirrors 2401 are arranged in an array. One micromirror 2401 (e.g., each micromirror 2401) corresponds to one pixel in the projection image to be displayed. As shown in FIG. 5, in the digital light processing (DLP) projection architecture, each micromirror 2401 is equivalent to a digital switch. The micromirror 2401 may swing within a range of minus 12° to plus 12° (i.e., ±12°) or a range of minus 17° to plus 17° (i.e., ±17°) due to an action of an external force.

Figure 6:
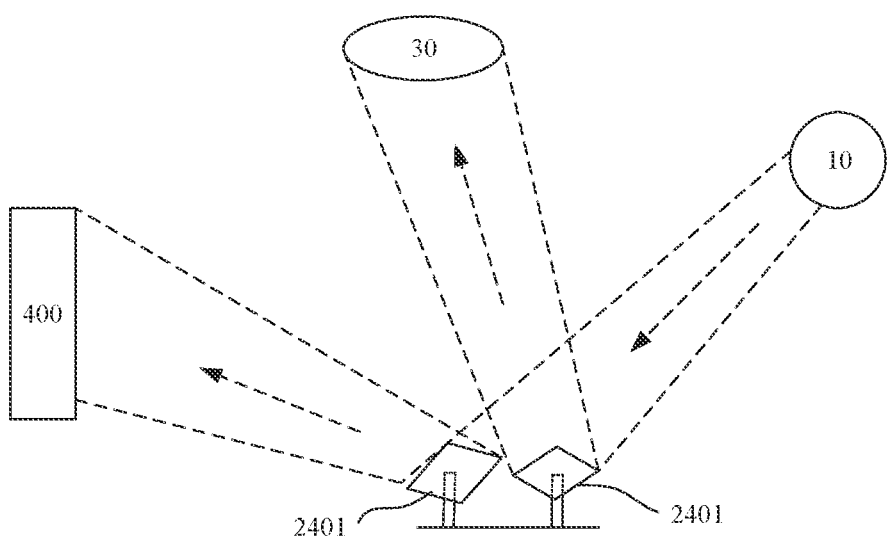
FIG. 6 is a schematic diagram showing operation of micromirrors, in accordance with some embodiments.

FIG. 6 is a schematic diagram showing operation of micromirrors, in accordance with some embodiments.

As shown in FIG. 6, a laser beam reflected by the micromirror 2401 at a negative deflection angle is referred to as an OFF laser beam, and the OFF laser beam is an ineffective laser beam, which usually irradiates on the housing of the light modulator 20 or is absorbed by a laser absorption portion 400. A laser beam reflected by the micromirror 2401 at a positive deflection angle is referred to as an ON laser beam. The ON laser beam is an effective beam reflected by the micromirror 2401 on a surface of the DMD 240 when it receives irradiation of the illumination beams, and the ON laser beam enters the projection lens 30 at a positive deflection angle for projection imaging. An ON state of the micromirror 2401 is a state that the micromirror 2401 is in and may be maintained when the illumination beams emitted by the laser source 10 may enter the projection lens 30 after being reflected by the micromirror 2401. That is, the micromirror 2401 is in a state of the positive deflection angle. An OFF state of the micromirror 2401 is a state that the micromirror 2401 is in and may be maintained when the illumination beams emitted by the laser source 10 does not enter the projection lens 30 after being reflected by the micromirror 2401. That is, the micromirror 2401 is in a state of the negative deflection angle.

For example, for a micromirror 2401 with a deflection angle of minus 12° or plus 12°, a state that the micromirror 2401 with the deflection angle of plus 12° is in is the open state, and a state that the micromirror 2401 with the deflection angle of minus 12° is in is the closed state. For a micromirror 2401 with a deflection angle of minus 17° or plus 17°, a state that the micromirror 2401 with the deflection angle of plus 17° is in is the open state, and a state that the micromirror 2401 with the deflection angle of minus 17° is in is the closed state. The image signals may be converted into digital codes such as 0 or 1 after being processed, and the micromirror 2401 may swing in response to these digital codes.

In a display cycle of a frame of an image, some or all of the micromirrors 2401 are switched once between the ON state and the OFF state, so that gray scales of pixels in the frame image are achieved according to durations of the micromirrors 2401 in the ON state and the OFF state. For example, in a case where the pixels have 256 gray scales from 0 to 255, micromirrors 2401 corresponding to a gray scale 0 are each in the OFF state in an entire display cycle of the frame of the image, micromirrors 2401 corresponding to a gray scale 255 are each in the ON state in the entire display cycle of the frame of the image, and micromirrors 2401 corresponding to a gray scale 127 are each in the ON state for a half of time and in the OFF state for another half of time in the display cycle of the frame of the image. Therefore, by controlling a state that each micromirror 2401 in the DMD 240 is in and a duration of each state in the display cycle of the frame of the image through the image signals, luminance (the gray scale) of a pixel corresponding to the micromirror 2401 may be controlled, thereby modulating the illumination beams projected onto the DMD 240.

It will be noted that, according to different projection architectures, the light valve 202 may be of many kinds, such as a liquid crystal on silicon (LOCOS), a liquid crystal display (LCD), or a digital micromirror device (DMD). In the embodiments of the present disclosure, the light modulator 20 shown in FIG. 6 applies the DLP projection architecture. Therefore, in some embodiments of the present disclosure, descriptions are mainly described by considering an example in which the light valve 202 is the digital micromirror device (DMD).

In some embodiments, as shown in FIGS. 3A and 3B, the laser projection apparatus 1 further includes an illumination lens group 203 located between the light homogenizing component 201 and the light valve 202. The laser beams homogenized by the light homogenizing component 201 may be incident on the light valve 202 through the illumination lens group 203. The illumination lens group 203 includes a reflective sheet F, a lens T (e.g., a convex lens), and a total internal reflection (TIR) prism L. The laser beams exiting from the light homogenizing component 201 may be incident on the reflective sheet F, and the reflective sheet F may reflect the incident laser beam to the lens T. The lens T may converge the incident laser beams to the total internal reflection prism L, and the total internal reflection prism L reflects the incident laser beams to the light valve 202.

Figure 7:
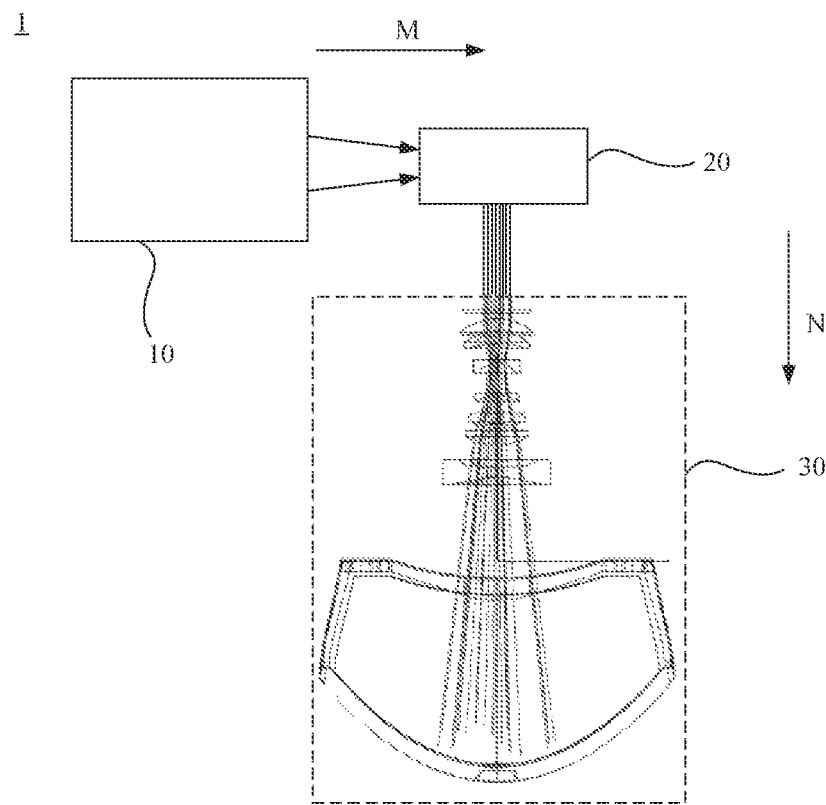
FIG. 7 is a diagram showing yet another beam path of a laser source, a light modulator, and a projection lens in a laser projection apparatus, in accordance with some embodiments.

FIG. 7 is a diagram showing yet another beam path of a laser source, a light modulator, and a projection lens in a laser projection apparatus, in accordance with some embodiments.

As shown in FIG. 7, the projection lens 30 includes a combination of a plurality of lenses, which are usually divided by group and are divided into a three-segment combination including a front group, a middle group and a rear group, or a two-segment combination including a front group and a rear group. The front group is a lens group proximate to a laser-exit side of the laser projection apparatus 1 (e.g., a side of the projection lens 30 away from the light modulator 20 along the N direction in FIG. 7), and the rear group is a lens group proximate to a laser-exit side of the light modulator 20 (e.g., a side of the projection lens 30 proximate to the light modulator 20 along the opposite direction of the N direction in FIG. 7). The projection lens 30 may be a zoom projection lens, or a prime focus-adjustable projection lens, or a prime projection lens.

For ease of description, some embodiments of the present disclosure are mainly described by considering an example in which the laser projection apparatus 1 adopts the DLP projection architecture, and the light valve 202 in the light modulator 20 is a digital micromirror device 240, however, this should not be construed as a limitation of the present disclosure.

The laser source 10 according to some embodiments of the present disclosure will be described in detail below.

Figure 8:
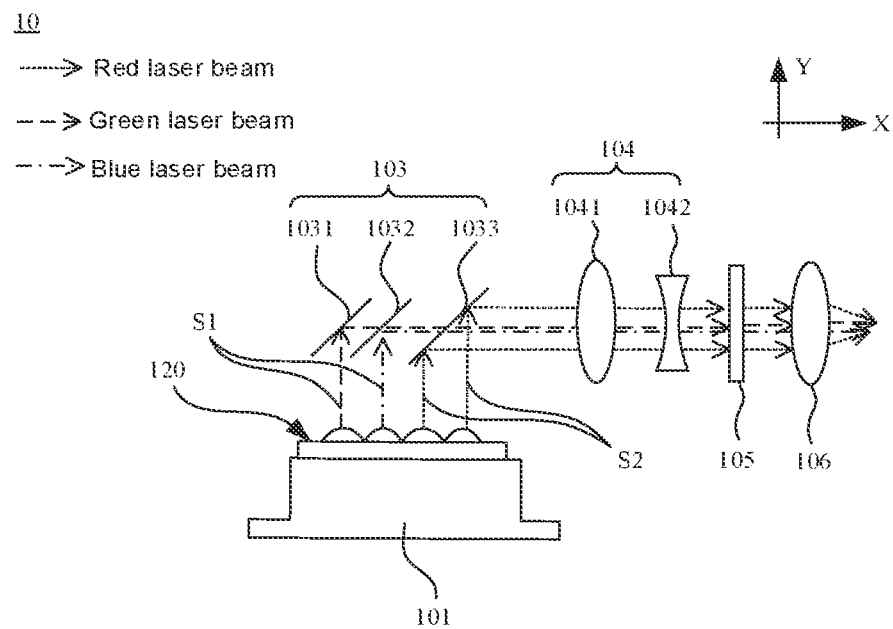
FIG. 8 is a diagram showing a structure of a laser source, in accordance with some embodiments.

FIG. 8 is a diagram showing a structure of a laser source, in accordance with some embodiments.

In some embodiments, as shown in FIG. 8, the laser source 10 includes a first laser device 101, a first combining lens group 103, a beam contraction lens group 104, a diffusion plate 105, and a converging lens 106.

The first laser device 101 is configured to emit a first type laser beam S1 and a second type laser beam S2 to the first combining lens group 103. The first type laser beam S1 has a different color from the second type laser beam S2.

The first combining lens group 103 is located on a laser-exit side of the first laser device 101. The first combining lens group 103 includes a plurality of lenses, and the first combining lens group 103 is configured to propagate the laser beams emitted by the first laser device 101 in a first direction (e.g., the X direction in FIG. 8). The first combining lens group 103, the beam contraction lens group 104, the diffusion plate 105, and the converging lens 106 are sequentially arranged in the first direction. The first laser device 101 and the first combining lens group 103 are sequentially arranged in a second direction (e.g., the Y direction in FIG. 8). The second direction is perpendicular to the first direction.

It will be noted that, an orthogonal projection of a beam spot formed by the first type laser beam S1 on a plane perpendicular to the first direction is smaller than an orthogonal projection of a beam spot formed by the second type laser beam S2 on the plane perpendicular to the first direction.

Figure 9:
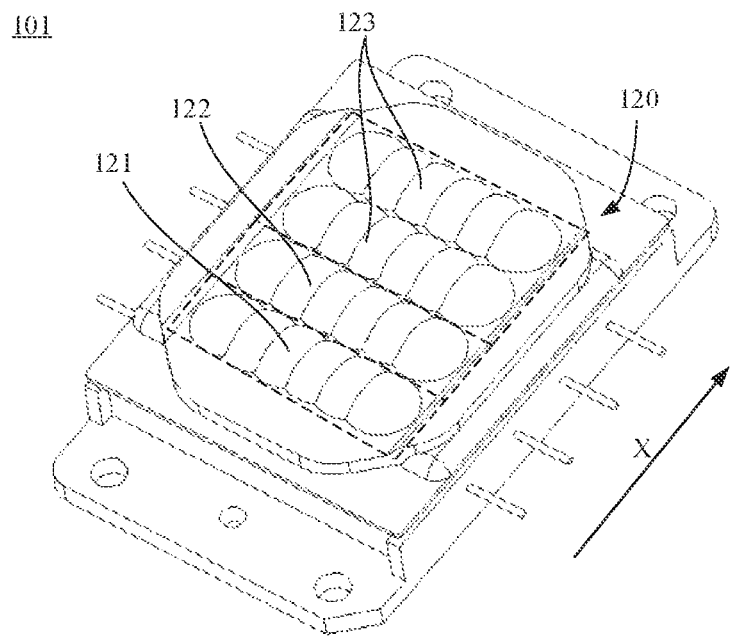
FIG. 9 is a diagram showing a structure of a first laser device in a laser source, in accordance with some embodiments.

FIG. 9 is a diagram showing a structure of a first laser device in a laser source, in accordance with some embodiments.

In some embodiments, as shown in FIG. 9, the first laser device 101 is a multi-chip laser diode (MCL) device. A laser-exit surface 120 of the first laser device 101 includes a first laser-exit region 121, a second laser-exit region 122, and a third laser-exit region 123. In FIG. 9, for convenience of distinction, each laser-exit region is separated by a dotted line. The first laser-exit region 121, the second laser-exit region 122, and the third laser-exit region 123 may be sequentially arranged in the first direction. The first laser-exit region 121 is configured to emit a laser beam of a first color, the second laser-exit region 122 is configured to emit a laser beam of a second color, and the third laser-exit region 123 is configured to emit a laser beam of a third color. The laser beam of the first color, the laser beam of the second color, and the laser beam of the third color are combined to form a white laser beam.

The present disclosure does not limit the colors of the laser beam of the first color, the laser beam of the second color and the laser beam of the third color, as long as the laser beam of the first color, the laser beam of the second color, and the laser beam of the third color may be combined to form the white laser beam.

It will be noted that, the first type laser beam S1 includes the laser beam of the first color and the laser beam of the second color. The second type laser beam S2 includes the laser beam of the third color.

In some embodiments, the laser beam of the first color emitted by the first laser-exit region 121 may be a green laser beam, the laser beam of the second color emitted by the second laser-exit region 122 may be a blue laser beam, and the laser beam of the third color emitted by the third laser-exit region 123 may be a red laser beam.

In some embodiments, the laser beam of the first color emitted by the first laser-exit region 121 may be a cyan laser beam, the laser beam of the second color emitted by the second laser-exit region 122 may be a yellow laser beam, and the laser beam of the third color emitted by the third laser-exit region 123 may be a magenta laser beam.

Some embodiments of the present disclosure are mainly described by considering an example in which the laser beam of the first color in the first type laser beam S1 is the green laser beam, the laser beam of the second color in the first type laser beam S1 is the blue laser beam, and the laser beam of the third color in the second type laser beam S2 is the red laser beam.

In some embodiments, the red laser beam emitted by the first laser device 101 may be one beam of laser beams or two beams of laser beams.

It will be noted that, in a case where the red laser beam emitted by the first laser device 101 includes two beams of laser beams, a distance between the two beams of red laser beams is small. For example, a distance between centers of beam spots of the two beams of red laser beams is substantially equal to 6 mm.

In some embodiments, as shown in FIG. 8, the first combining lens group 103 includes a first lens 1031, a second lens 1032, and a third lens 1033. The first lens 1031, the second lens 1032, and the third lens 1033 are sequentially arranged in the first direction. On the plane perpendicular to the first direction, an orthogonal projection of the first lens 1031 overlaps with an orthogonal projection of the second lens 1032. The first lens 1031 corresponds to the first laser-exit region 121, the second lens 1032 corresponds to the second laser-exit region 122, and the third lens 1033 corresponds to the third laser-exit region 123. On the laser-exit surface 120 of the first laser device 101, the orthogonal projection of each lens may at least partially overlap with the corresponding laser-exit region, the laser beam exiting from each laser-exit region may be incident on the corresponding lens, and each lens may reflect the laser beam exiting from the corresponding laser-exit region.

In some embodiments, the first lens 1031 corresponding to the first laser-exit region 121 is a reflector that reflects laser beams of all colors. Alternatively, the first lens 1031 corresponding to the first laser-exit region 121 is a dichroic mirror that reflects the green laser beam and transmits laser beams of the other colors. The second lens 1032 corresponding to the second laser-exit region 122 is a dichroic mirror that transmits the green laser beam and reflects the blue laser beam. The third lens 1033 corresponding to the third laser-exit region 123 is a dichroic mirror that transmits the blue laser beam and the green laser beam and reflects the red laser beam.

It will be noted that, positions of the first laser-exit region 121 and the second laser-exit region 122 may be changed. That is, the second laser-exit region 122, the first laser-exit region 121, and the third laser-exit region 123 may be sequentially arranged in the first direction. The first lens 1031 corresponding to the second laser-exit region 122 is a reflector that reflects the laser beams of all colors. Alternatively, the first lens 1031 corresponding to the second laser-exit region 122 is a dichroic mirror that reflects the blue laser beam and transmits the laser beams of other colors. The second lens 1032 corresponding to the first laser-exit region 121 is a dichroic mirror that transmits the blue laser beam and reflects the green laser beam. The third lens 1033 corresponding to the third laser-exit region 123 is a dichroic mirror that transmits the blue laser beam and the green laser beam and reflects the red laser beam.

The first type laser beam S1 (i.e., the green laser beam and the blue laser beam) and the second type laser beam S2 (i.e., the red laser beam) emitted by the first laser device 101 are incident on different lenses of the first combining lens group 103.

For example, the first type laser beam S1 (i.e., the green laser beam) emitted by the first laser-exit region 121 of the first laser device 101 is incident on the first lens 1031, the first type laser beam S1 (i.e., the blue laser beam) emitted by the second laser-exit region 122 of the first laser device 101 is incident on the second lens 1032, and the second type laser beam S2 (i.e., the red laser beam) emitted by the third laser-exit region 123 of the first laser device 101 is incident on the third lens 1033. The first lens 1031 and the second lens 1032 each may reflect the incident first type laser beam S1 along the first direction, and the third lens 1033 may reflect the incident second type laser beam S2 along the first direction.

Since the red laser beam has a large divergence degree in a case where the green laser beam, the blue laser beam, and the red laser beam have a same optical path length, in order to obtain a red laser beam spot with a small divergence degree, the third laser-exit region 123 emitting the second type laser beam S2 (i.e., the red laser beam) is closer to the light modulator 20 than the first laser-exit region 121 and the second laser-exit region 122. Similarly, the third lens 1033 is closer to the light modulator 20 than the first lens 1031 and the second lens 1032. However, the present disclosure is not limited thereto, and in some embodiments, in the first combining lens group 103, the third lens 1033, the second lens 1032, and the first lens 1031 may also be sequentially arranged along the first direction.

Some embodiments of the present disclosure are mainly described by considering an example in which the first combining lens group 103 includes the first lens 1031, the second lens 1032, and the third lens 1033, and the first lens 1031 corresponds to the green laser beam emitted by the first laser-exit region 121 of the first laser device 101, the second lens 1032 corresponds to the blue laser beam emitted by the second laser-exit region 122 of the first laser device 101, and the third lens 1033 corresponds to the red laser beam emitted by the third laser-exit region 123 of the first laser device 101.

In some embodiments, as shown in FIG. 8, the third lens 1033 of the first combining lens group 103 includes one lens.

In some embodiments, the third lens 1033 of the first combining lens group 103 may also include a plurality of lenses. The plurality of lenses of the third lens 1033 may split the laser beam incident on the third lens 1033 into a plurality of beams of laser beams.

Figure 10:
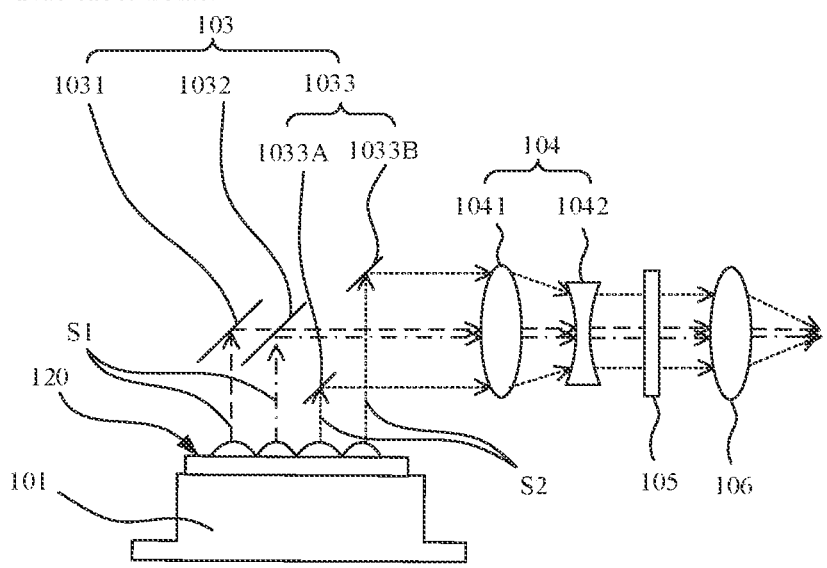
FIG. 10 is a diagram showing a structure of another laser source, in accordance with some embodiments.

FIG. 10 is a diagram showing a structure of another laser source, in accordance with some embodiments. For example, as shown in FIG. 10, the third lens 1033 of the first combining lens group 103 includes two sub-lenses (i.e., a first sub-lens 1033A and a second sub-lens 1033B). The first sub-lens 1033A is closer to the laser-exit surface 120 of the first laser device 101 than the second sub-lens 1033B. The first sub-lens 1033A and the second sub-lens 1033B separate the two beams of red laser beams emitted by the first laser device 101 and reflect the two beams of the red laser beams to different positions of the beam contraction lens group 104 along the first direction.

In some embodiments, the beam contraction lens group 104 is configured to contract the incident laser beam, so as to reduce a beam width of the laser beam. As shown in FIG. 10, the beam contraction lens group 104 includes a convex lens 1041 and a concave lens 1042. The convex lens 1041 and the concave lens 1042 are arranged in the first direction, and the convex lens 1041 is closer to the first combining lens group 103 than the concave lens 1042. The convex lens 1041 and the concave lens 1042 constitute a Galileo telescope.

However, the present disclosure is not limited thereto. In some embodiments, the beam contraction lens group 104 is a Kepler telescope. Alternatively, the beam contraction lens group 104 may include two convex lenses. One of the two convex lenses is configured to converge the laser beam to another convex lens, the another convex lens serves as a field lens, so as to reduce the divergence angle of the converged laser beam, thereby achieving beam contraction of the laser beam.

It will be noted that, in some embodiments, the light homogenizing component 201 (e.g., a fly-eye lens) in the light modulator 20 may also be arranged on a laser-inlet of the beam contraction lens group 104.

In some embodiments, the diffusion plate 105 is located on a laser-exit side of the beam contraction lens group 104 and is configured to diffuse the incident laser beam. The diffusion plate 105 includes a plurality of microstructures with different diffusion angles. For example, the microstructure may be a structure similar to a micro convex lens.

When the laser projection apparatus 1 performs projection display, a speckle effect is usually generated. The speckle effect refers to an effect in which two laser beams emitted by a coherent beam source interfere in space after they scatter when they irradiate a rough object (e.g., the screen of the laser projection apparatus 1), and finally a granular bright and dark spot appears on the screen. The speckle effect makes a display effect of the projected image poor, and these bright and dark unfocused spots are in a flickering state in the human eyes, which is prone to dizziness when viewed for a long time.

The laser beams reflected by the first combining lens group 103 may be uniform due to an action of the diffusion plate 105, so that the laser beams may generate weak interference during projection. As a result, the speckle effect of the laser projection apparatus 1 during projection display may be reduced, the blurring of the projected image may be avoided, the display effect of the projected image may be improved, and the dizziness caused by human eyes may be reduced.

In some embodiments, the diffusion plate 105 may also be moved back and forth in the second direction. Alternatively, the diffusion plate 105 may also be rotated along an axis that passes through a center point of the diffusion plate 105 and is parallel to the first direction. By moving the diffusion plate 105, the laser beams may be incident on different positions of the diffusion plate 105 at different moments, so that divergence angles of the laser beams at different moments are different from each other. In this way, speckle patterns with different shapes and positions formed by the laser beams during projection are dispersed and overlapped by the laser projection apparatus 1, thereby making it difficult for users to see obvious speckle patterns, so that the speckles are eliminated.

Of course, in some embodiments, the diffusion plate 105 may also vibrate on a two-dimensional plane, so as to achieve the effect of eliminating speckle. For example, the diffusion plate 105 vibrates reciprocally in two directions perpendicular to each other.

In some embodiments, the converging lens 106 is located on a laser-exit side of the diffusion plate 105 and is configured to converge the incident laser beam and propagate the laser beam to a beam outlet of the laser source 10. Afterwards, the laser beam is incident to the light homogenizing component 201 of the light modulator 20 from the beam outlet of the laser source 10.

The laser beams emitted by the first laser device 101 are incident on the first combining lens group 103 and then reflected to the beam contraction lens group 104. The laser beams are contracted by the beam contraction lens group 104 and then sequentially pass through the diffusion plate 105 and the converging lens 106 and are incident on the beam outlet of the laser source 10.

Figure 11:
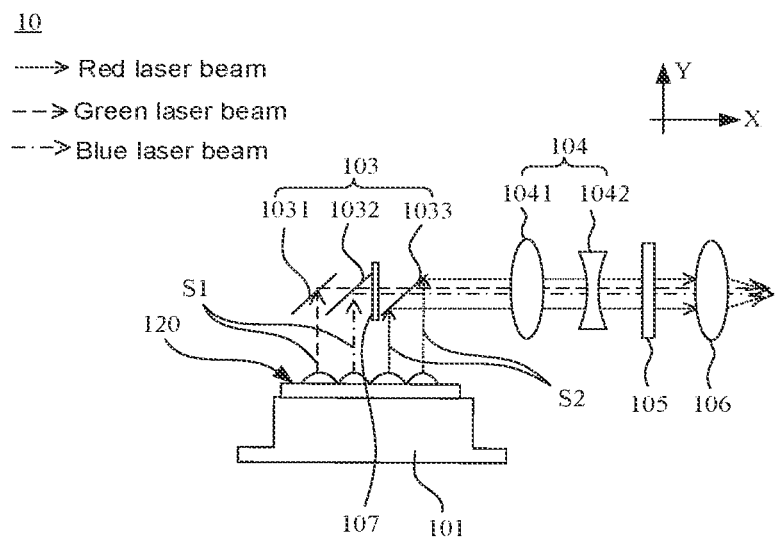
FIG. 11 is a diagram showing a structure of yet another laser source, in accordance with some embodiments.

FIG. 11 is a diagram showing a structure of yet another laser source, in accordance with some embodiments.

Figure 12:
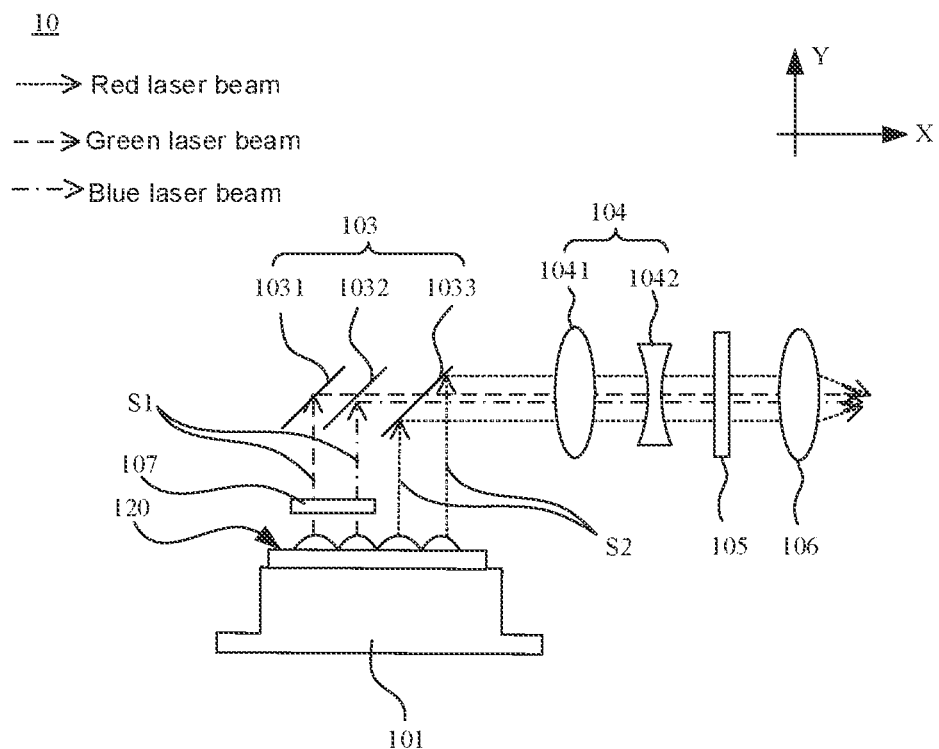
FIG. 12 is a diagram showing a structure of yet another laser source, in accordance with some embodiments.

In some embodiments, as shown in FIGS. 11 and 12, the laser source 10 further includes a beam expanding component 107. The beam expanding component 107 is located in a laser-exit path of the first type laser beams S1 emitted by the first laser device 101 and is configured to increase a divergence angle of the first type laser beams S1 emitted by the first laser device 101.

In some embodiments, as shown in FIG. 11, the beam expanding component 107 is located between the second lens 1032 and the third lens 1033. Moreover, on the plane perpendicular to the first direction, an orthogonal projection of the beam expanding component 107 at least partially overlaps with an orthogonal projection of the first lens 1031 or the second lens 1032. The first type laser beam S1 emitted by the first laser device 101 is reflected by the first lens 1031 and the second lens 1032, and then is incident on the beam expanding component 107, and is combined with the second type laser beam S2 reflected by the third lens 1033 after being expanded by the beam expanding component 107.

For example, on the plane perpendicular to the first direction, the orthogonal projection of the beam expanding component 107 completely overlaps with the orthogonal projection of the first lens 1031 or the second lens 1032. Alternatively, on the plane perpendicular to the first direction, the orthogonal projection of the first lens 1031 or the second lens 1032 is a portion of the orthogonal projection of the beam expanding component 107. Alternatively, on the plane perpendicular to the first direction, an orthogonal projection of a region of the first lens 1031 or the second lens 1032 that receives the first type laser beam S1 is located within the orthogonal projection of the beam expanding component 107. The present disclosure does not limit thereto, as long as the first type laser beam S1 (i.e., the green laser beam and the blue laser beam) reflected by the first lens 1031 and the second lens 1032 may be incident on the beam expanding component 107.

In this way, when the expanded first type laser beam S1 is combined with the second type laser beam S2, a difference between a size of the beam spot of the first type laser beam S1 and a size of the beam spot of the second type laser beam S2 is small. Therefore, the light combining effect of the first type laser beam S1 and the second type laser beam S2 is good, and the color uniformity of the beam spot formed by the laser beams emitted by the laser source 10 is good.

FIG. 12 is a diagram showing a structure of yet another laser source, in accordance with some embodiments. A position of the beam expanding component 107 in FIG. 12 is different from that in FIG. 11.

In some embodiments, the beam expanding component 107 may be located between the first laser device 101 and at least one of the first lens 1031 or the second lens 1032. For example, as shown in FIG. 12, the beam expanding component 107 is located between the laser-exit surface 120 of the first laser device 101 and the first lens 1031 and between the laser-exit surface 120 of the first laser device 101 and second lens 1032. On the laser-exit surface 120 of the first laser device 101, the orthogonal projection of the beam expanding component 107 at least partially overlaps with the orthogonal projections of the first lens 1031 and the second lens 1032, and the orthogonal projection of the beam expanding component 107 does not overlap with the orthogonal projection of the third lens 1033.

In this way, the first type laser beam S1 emitted by the first laser device 101 may be incident on the beam expanding component 107, and then incident on the first lens 1031 and the second lens 1032 after being expanded by the beam expanding component 107. Then, the expanded first type laser beam S1 is reflected to the third lens 1033 by the first lens 1031 and second lens 1032 in the first direction, so as to be combined with the second type laser beam S2 reflected by the third lens 1033.

Here, among the laser beams emitted by the first laser device 101, only the first type laser beam S1 is expanded by the beam expanding component 107. That is, the first type laser beam S1 is expanded by the beam expanding component 107, while the second type laser beam S2 is not expanded by the beam expanding component 107.

In some embodiments of the present disclosure, the first type laser beam S1 emitted by the first laser device 101 has a small beam spot, and the first type laser beam S1 is combined with the second type laser beam S2 after the divergence angle of the first type laser beam S1 is increased (i.e., expanded) by the beam expanding component 107. In this case, since the beam spot of the first type laser beam S1 has been expanded and the beam spot of the second type laser beam S2 remains unchanged. The difference between the size (e.g., the area) of the beam spot formed by the first type laser beam S1 emitted by the first laser device 101 and the size (e.g., the area) of the beam spot formed by the second type laser beam S2 is reduced. In this way, the color uniformity of the beam spot formed by the first type laser beam S1 and the second type laser beam S2 is good after the first type laser beam S1 is combined with the second type laser beam S2, thereby improving the color uniformity and the display effect of the projection image.

In some embodiments, the beam expanding component 107 may include a diffusion sheet, a fly-eye lens, or a diffractive optical element.

For example, in a case where the beam expanding component 107 includes the diffractive optical element, the laser beams exiting from the first combining lens group 103 may form a beam spot with a shape of a rectangle after passing through the diffractive optical element. The diffractive optical element has a strong constrain effect on an edge of the beam spot, and a lot of diffused laser beams may exit from the diffractive optical element after the diffractive optical element diffuses the laser beams, so as to reduce the loss of the laser beams passing through the diffractive optical element. Moreover, the diffractive optical element may split a laser beam into multiple "spot" images. That is to say, the diffractive optical element may uniformly diffuse a laser beam to multiple positions in a region.

Since the laser beams emitted by the first laser device 101 in some embodiments of the present disclosure include a plurality of beams of laser beams, the diffractive optical element may uniformly diffuse each laser beam of the laser device. Therefore, the diffractive optical element may diffuse and homogenize the first type laser beam S1, so as to improve the color uniformity of the beam spot formed by the first type laser beam S1 and the second type laser beam S2 after the first type laser beam S1 is combined with the second type laser beam S2.

Figure 13A:
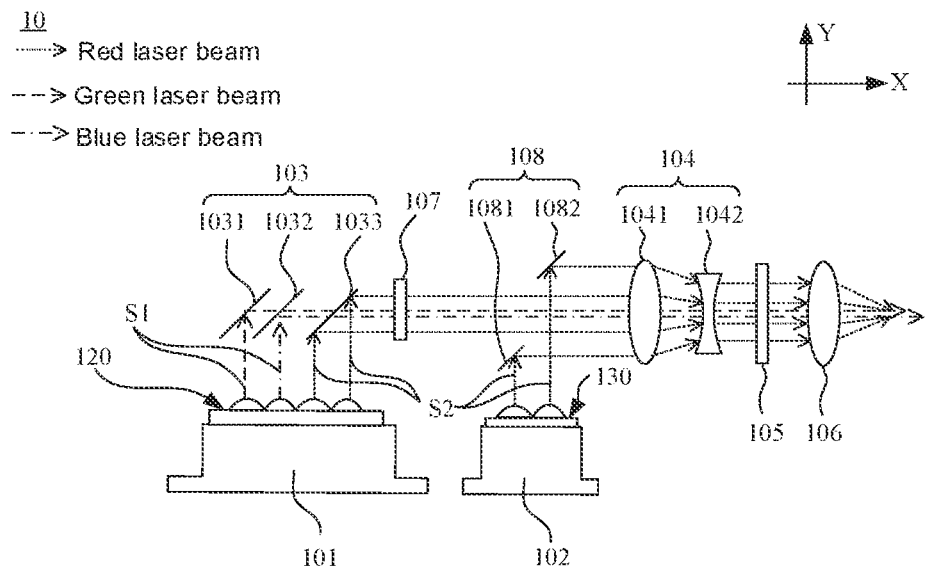
FIG. 13A is a diagram showing a structure of yet another laser source, in accordance with some embodiments.

FIG. 13A is a diagram showing a structure of yet another laser source, in accordance with some embodiments.

In some embodiments, the laser source 10 as shown in FIG. 13A is provided. The main difference among FIG. 13A, FIG. 11, and FIG. 12 is that the beam expanding component 107 is arranged in different positions, and the laser source 10 further includes a second laser device 102 and a second combining lens group 108. The second combining lens group 108 is located on a laser-exit side of the second laser device 102. The second laser device 102 is configured to emit the second type laser beam S2 to the second combining lens group 108. The second combining lens group 108 is configured to reflect the second type laser beam S2 emitted by the second laser device 102 in the first direction. It will be noted that the second laser device 102 may also emit the first type laser beam S1.

The first combining lens group 103, the beam expanding component 107, and the second combining lens group 108 are sequentially arranged in the first direction, and an arrangement direction of the second laser device 102 and the second combining lens group 108 is perpendicular to the first direction.

In some embodiments, an arrangement direction of the first laser device 101 and the first combining lens group 103 is the same as an arrangement direction of the second laser device 102 and the second combining lens group 108. For example, as shown in FIG. 13A, the first laser device 101 and the first combining lens group 103 are sequentially arranged in the second direction, and the second laser device 102 and the second combining lens group 108 are also sequentially arranged in the second direction.

Figure 13B:
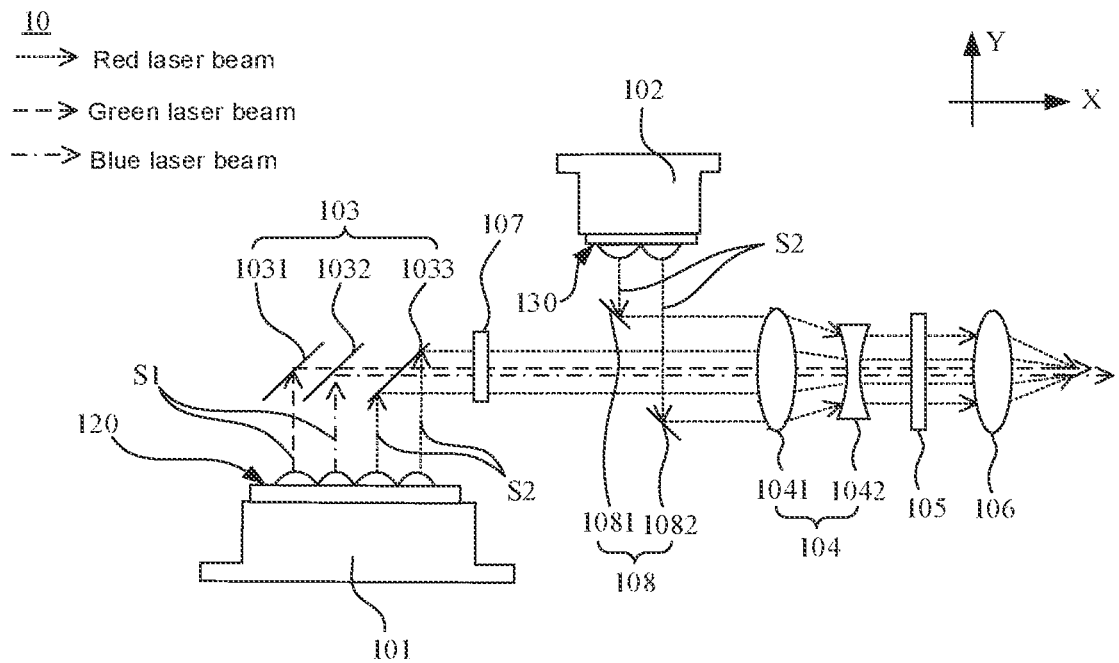
FIG. 13B is a diagram showing a structure of yet another laser source, in accordance with some embodiments.

FIG. 13B is a diagram showing a structure of yet another laser source, in accordance with some embodiments. The main difference between FIG. 13B and FIG. 13A is that the arrangement direction of the second laser device 102 and the second combining lens group 108 in FIG. 13B is different from the arrangement direction of the second laser device 102 and the second combining lens group 108 in FIG. 13A.

In some embodiments, the arrangement direction of the first laser device 101 and the first combining lens group 103 may also be opposite to the arrangement direction of the second laser device 102 and the second combining lens group 108.

For example, as shown in FIG. 13B, the first laser device 101 and the first combining lens group 103 are sequentially arranged in the second direction (e.g., the Y direction in FIG. 13B), and the second laser device 102 and the second combining lens group 108 are sequentially arranged in an opposite direction of the Y direction.

It will be noted that, the arrangement direction of the first laser device 101 and the first combining lens group 103, and the arrangement direction of the second laser device 102 and the second combining lens group 108 may also be other directions, and the present disclosure is not limited thereto.

In addition, the second type laser beam S2 emitted by the second laser device 102 is the same as the second type laser beam S2 emitted by the first laser device 101, and they are the red laser beam. For convenience of distinction, the second type laser beam S2 emitted by the first laser device 101 is referred to as a first red laser beam, and the second type laser beam S2 emitted by the second laser device 102 is referred to as a second red laser beam.

Similar to the second type laser beam S2 emitted by the first laser device 101, the second red laser beam emitted by the second laser device 102 may be one beam of laser beams or two beam of laser beams.

In some embodiments, the second laser device 102 is a multi-chip laser diode (MCL) device. Moreover, the second red laser beam emitted by the second laser device 102 has the same luminance as the first red laser beam emitted by the first laser device 101.

In some embodiments, the first laser device 101 and the second laser device 102 each include a plurality of light-emitting chips arranged in an array, and each row of the light-emitting chips in the plurality of light-emitting chips is configured to emit laser beams of a same color (i.e., one row of the light-emitting chips corresponds to one beam of laser beams). The number of light-emitting chips in the first laser device 101 that emit the first red laser beam is the same as the number of light-emitting chips in the second laser device 102, so as to make the luminance of the first red laser beam emitted by the first laser device 101 be the same as the luminance of the second red laser beam emitted by the second laser device 102.

For example, the first laser device 101 includes a plurality of light-emitting chips arranged in four rows and seven columns. One row of the light-emitting chips emits the blue laser beam, one row of the light-emitting chips emits the green laser beam, and the other two rows of the light-emitting chips emit the first red laser beam. The second laser device 102 includes a plurality of light-emitting chips arranged in two rows and seven columns. The two rows of light-emitting chips emit the second red laser beam.

Alternatively, the first laser device 101 includes a plurality of light-emitting chips arranged in four rows and five columns, and the second laser device 102 includes a plurality of light-emitting chips arranged in two rows and five columns. The number of the light-emitting chips in the first laser device 101 and the number of the light-emitting chips in the second laser device 102 may also be other numbers, and the present disclosure is not limited thereto.

In some embodiments, the first laser device 101 or the second laser device 102 further includes a base plate and a tube shell disposed on the base plate. The plurality of light-emitting chips of the first laser device 101 or the second laser device 102 are arranged in an array and encapsulated in the tube shell. The first laser device 101 or the second laser device 102 may include one or more tube shells.

In a case where the first laser device 101 or the second laser device 102 includes one tube shell, and the plurality of light-emitting chips are arranged in an array and encapsulated in the tube shell, and the plurality of light-emitting chips in the tube shell may emit laser beams of a same color or laser beams of different colors.

In a case where the first laser device 101 or the second laser device 102 includes a plurality of tube shells, the plurality of tube shells may share a same base plate, and the plurality of light-emitting chips may be encapsulated in the plurality of tube shells, and two or more light-emitting chips in each tube shell are arranged in an array. The plurality of light-emitting chips in each tube shell may emit laser beams of a same color or laser beams of different colors. For example, in a case where the first laser device 101 or the second laser device 102 includes two tube shells, the plurality of light-emitting chips in one tube shell emit the red laser beam, and the plurality of light-emitting chips in the other tube shell emit the green laser beam and the blue laser beam.

It will be noted that, the first laser device 101 and the second laser device 102 may be an encapsulating assembly of a same laser device, or may be formed by different encapsulating assemblies in a plurality of laser devices.

For example, the first laser device 101 and the second laser device 102 share a same tube shell, and the plurality of light-emitting chips in the tube shell may emit laser beams of different colors. Alternatively, the first laser device 101 and the second laser device 102 each include a plurality of tube shells, and the plurality of tube shells are arranged on a same base plate. Alternatively, the first laser device 101 and the second laser device 102 each include a separate base plate and a separate tube shell.

Figure 13C:
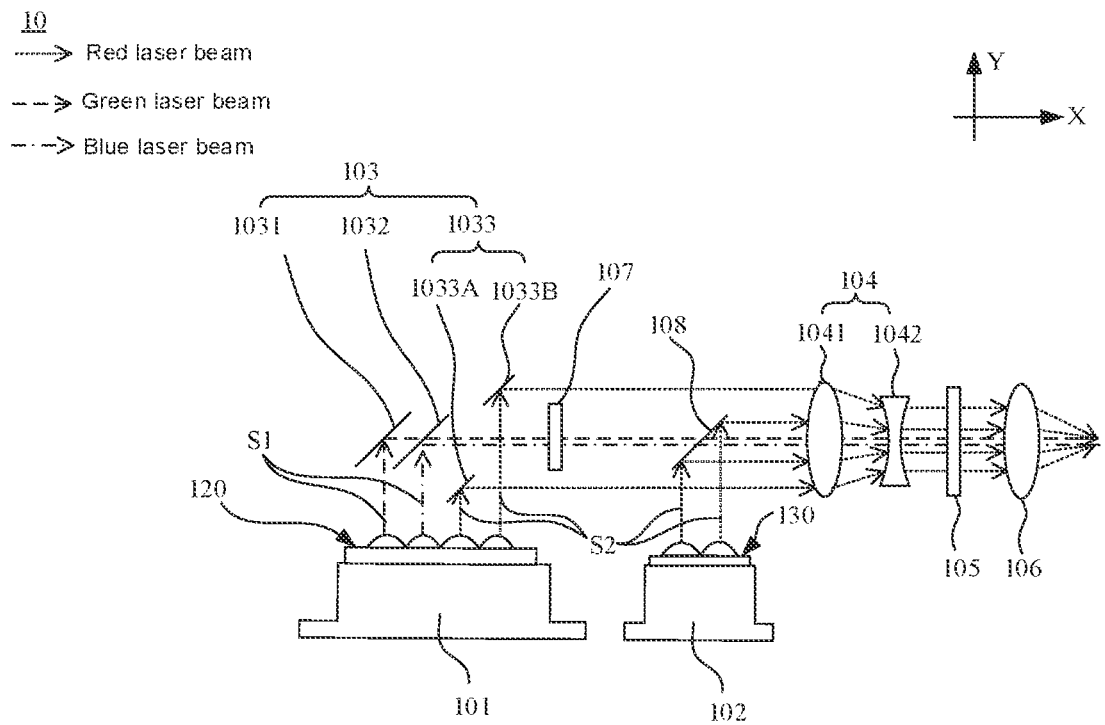
FIG. 13C is a diagram showing a structure of yet another laser source, in accordance with some embodiments.
Figure 13D:
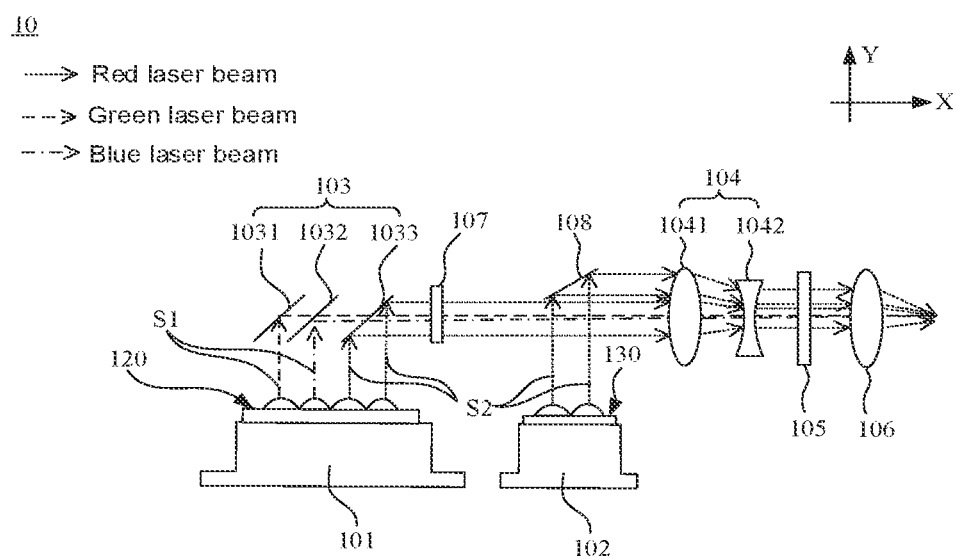
FIG. 13D is a diagram showing a structure of yet another laser source, in accordance with some embodiments.

FIG. 13C is a diagram showing a structure of yet another laser source, in accordance with some embodiments. FIG. 13D is a diagram showing a structure of yet another laser source, in accordance with some embodiments.

In some embodiments, as shown in FIGS. 13A, 13B, 13C and 13D, on the plane perpendicular to the first direction, an orthogonal projection of the second combining lens group 108 does not overlap with (e.g., is separated from) the orthogonal projection of the third lens 1033 of the first combining lens group 103.

In this way, a beam path of the second type laser beam S2 reflected by the second combining lens group 108 does not overlap with (e.g., is separated from) a beam path of the second type laser beam S2 reflected by the first combining lens group 103. The second type laser beam S2 (i.e., the first red laser beam) reflected by the third lens 1033 in the first direction may not be incident on the lens of the second combining lens group 108, so as to prevent the lens of the second combining lens group 108 from blocking the second type laser beam S2 reflected by the third lens 1033.

In some embodiments, the lens of the second combining lens group 108 may be a reflector and reflects the laser beams with all wavelengths. For example, the reflector reflects the first type laser beam S1 and the second type laser beam S2.

In some embodiments, the lens of the second combining lens group 108 may also be a dichroic mirror, so that the lens of the second combining lens group 108 may reflect the laser beams corresponding to some wavelengths. For example, the dichroic mirror reflects the second type laser beam S2 and transmit the first type laser beam S1.

In some embodiments, the second combining lens group 108 includes one or more lenses.

In a case where the second combining lens group 108 includes a plurality of lenses, the plurality of lenses of the second combining lens group 108 may split one beam of laser beams incident on the second combining lens group 108 into a plurality of beams of laser beams. Moreover, on the plane perpendicular to the first direction, orthogonal projections of the lenses of the second combining lens group 108 do not overlap with (e.g., are separated from) each other, so as to prevent any one of the plurality of lenses from blocking the laser beams reflected by the other lenses of the second combining lens group 108.

In some embodiments, as shown in FIGS. 13C and 13D, the second combining lens group 108 includes one lens.

As shown in FIG. 13C, on the plane perpendicular to the first direction, the orthogonal projection of the lens of the second combining lens group 108 at least partially overlaps with the orthogonal projection of the first lens 1031 (or second lens 1032). The beam expanding component 107 is located between the first combining lens group 103 and the second combining lens group 108. Moreover, on the plane perpendicular to the first direction, the orthogonal projection of the beam expanding component 107 at least partially overlaps with the orthogonal projection of the first lens 1031 (or the second lens 1032).

In this case, the lens of the second combining lens group 108 is configured to reflect the second type laser beam S2 emitted by the second laser device 102, transmit the first type laser beam S1 exiting from the beam expanding component 107 and propagate the first type laser beam S1 and the second type laser beam S2 after combing to the beam contraction lens group 104.

For example, as shown in FIG. 13C, the third lens 1033 of the first combining lens group 103 includes a first sub-lens 1033A and a second sub-lens 1033B. On the plane perpendicular to the first direction, the orthogonal projection of the third lens 1033 is located outside the orthogonal projections of the first lens 1031 and the second lens 1032. The beam paths of the first type laser beam S1 and the second type laser beam S2 exiting from the second combining lens group 108 do not overlap with (e.g., are separated from) the beam path of the second type laser beam S2 reflected by the third lens 1033 (i.e., the first sub-lens 1033A and the second sub-lens 1033B).

The first lens 1031 and the second lens 1032 reflect the first type laser beam S1 to the beam expanding component 107, and the beam expanding component 107 diffuses the first type laser beam S1 and then propagates the first type laser beam S1 to the lenses of the second combining lens group 108. The third lens 1033 reflects the second type laser beam S2 emitted by the first laser device 101 directly to the beam contraction lens group 104 in the first direction, and the second type laser beam S2 reflected by the third lens 1033 does not pass through the beam expanding component 107.

The lens of the second combining lens group 108 reflects the second type laser beam S2 emitted by the second laser device 102 and transmits the first type laser beam S1 exiting from the beam expanding component 107. The first type laser beam S1 continues to propagate in the first direction after being transmitted by the second combining lens group 108 and is incident on the beam contraction lens group 104. The first type laser beam S1 and the second type laser beam S2 sequentially pass through the diffusion plate 105 and the converging lens 106 after being contracted by the beam contraction lens group 104 and are incident on the beam outlet of the laser source 10.

It will be noted that, by adjusting positions of the first sub-lens 1033A, the second sub-lens 1033B, and the second combining lens group 108, it is possible to reduce an area of the total beam spot of the combined second type laser beams S2 (e.g., the red laser beams).

In some embodiments, as shown in FIG. 13A, the second combining lens group 108 includes two lenses, such as a fourth lens 1081 and a fifth lens 1082. The fourth lens 1081 is closer to a laser-exit surface 130 of the second laser device 102 than the fifth lens 1082.

The fourth lens 1081 and the fifth lens 1082 may split the second type laser beam S2 incident to the second combining lens group 108 emitted by the second laser device 102 into two beams of laser beams, and the fourth lens 1081 and the fifth lens 1082 each are configured to reflect the second type laser beam S2 emitted by the second laser device 102 to the beam contraction lens group 104 in the first direction.

On the plane perpendicular to the first direction, the orthogonal projection of the first lens 1031 (or the second lens 1032) at least partially overlaps with the orthogonal projection of the third lens 1033, and an orthogonal projection of the fourth lens 1081 (or the fifth lens 1082) does not overlap with the orthogonal projection of the first lens 1031 (or the second lens 1032 or the third lens 1033).

For example, as shown in FIG. 13A, the third lens 1033 of the first combining lens group 103 includes one lens, and on the plane perpendicular to the first direction, an orthogonal projection of the lens at least partially overlaps with the orthogonal projection of the first lens 1031 (or the second lens 1032). On the plane perpendicular to the first direction, the orthogonal projections of the fourth lens 1081 and the fifth lens 1082 are respectively located on two sides of orthogonal projections of all lenses of the first combining lens group 103 in the second direction. In this way, the fourth lens 1081 and the fifth lens 1082 may be respectively located on two sides of all lenses of the first combining lens group 103 in the second direction, so that the two second type laser beams S2 reflected by the fourth lens 1081 and the fifth lens 1082 may be respectively located on two opposite sides of the laser beams exiting from the first combining lens group 103, thereby improving the distribution uniformity of the second type laser beam S2.

In some embodiments, as shown in FIG. 13D, in a case where the second combining lens group 108 includes one lens, on the plane perpendicular to the first direction, an orthogonal projection of the lens of the second combining lens group 108 may also be located on a side of the orthogonal projections of all lenses of the first combining lens group 103 in the second direction.

In the laser source 10 provided in some embodiments of the present disclosure, the size of the beam spot of the first type laser beam S1 emitted by the first laser device 101 is small, and the first type laser beam S1 is combined with the second type laser beam S2 after the divergence angle of the first type laser beam S1 is increased by the beam expanding component 107, so as to reduce the difference between the size of the 2?beam spot formed by the first type laser beam S1 emitted by the first laser device 101 and the size of the beam spot formed by the second type laser beam S2. In this way, the color uniformity of the beam spot formed by the first type laser beam S1 and the second type laser beam S2 is good after the first type laser beam S1 is combined with the second type laser beam S2, thereby improving the color uniformity and the display effect of the projection image.

The laser beams emitted by the light-emitting chips in a laser device are linearly polarized light. A mode of resonant cavity oscillation of a red light-emitting chip when the red light-emitting chip is emitting light is different from modes of resonant cavity oscillation of a blue light-emitting chip and a green light-emitting chip when the blue light-emitting chip and the green light-emitting chip are emitting light, which causes a phenomenon that a polarization direction of red linearly polarized light is substantially 90° different from a polarization direction of blue linearly polarized light or a polarization direction of green linearly polarized light. For example, in a case where the laser-exit surface 120 of the first laser device 101 and the laser-exit surface 130 of the second laser device 102 are parallel to each other, the polarization direction of the red laser beam emitted from the laser-exit surface 120 of the first laser device 101 or the laser-exit surface 130 of the second laser device 102 is substantially perpendicular to the polarization direction of the blue laser beam and the green laser beam emitted from the laser-exit surface 120 of the first laser device 101 or the laser-exit surface 130 of the second laser device 102. In this case, the polarization directions of the laser beams of three colors emitted by the laser source 10 are different from each other, which may cause the projection image of the laser projection apparatus 1 using the laser source 10 to have an uneven chromaticity phenomenon such as "color spots" and "color blocks".

There are two reasons for this phenomenon. In one aspect, the optical lenses (e.g., the lenses and the prisms) in the laser projection apparatus 1 have different transmissivities and reflectivities for the polarized light with different polarization directions. For example, the optical lenses have a higher transmissivity for the P-polarized light than that for the S-polarized light. In another aspect, the screen has different transmissivities and reflectivities for the laser beams with different polarization directions.

A wave plate may change a vibration direction of the linearly polarized light. The wave plate mainly includes a quarter-wave plate, a half-wave plate, and a full-wave plate. The half-wave plate may change a polarization direction of a laser beam by substantially 900.

In some embodiments of the present disclosure, a polarization direction of the first type laser beam S1 (i.e., the green laser beam and the blue laser beam) emitted by the first laser device 101 is a first polarization direction, and the polarization direction of the second type laser beam S2 (i.e., the first red laser beam and the second red laser beam) emitted by the first laser device 101 and the second laser device 102 is a second polarization direction. The first polarization direction is perpendicular to the second polarization direction.

Figure 14:
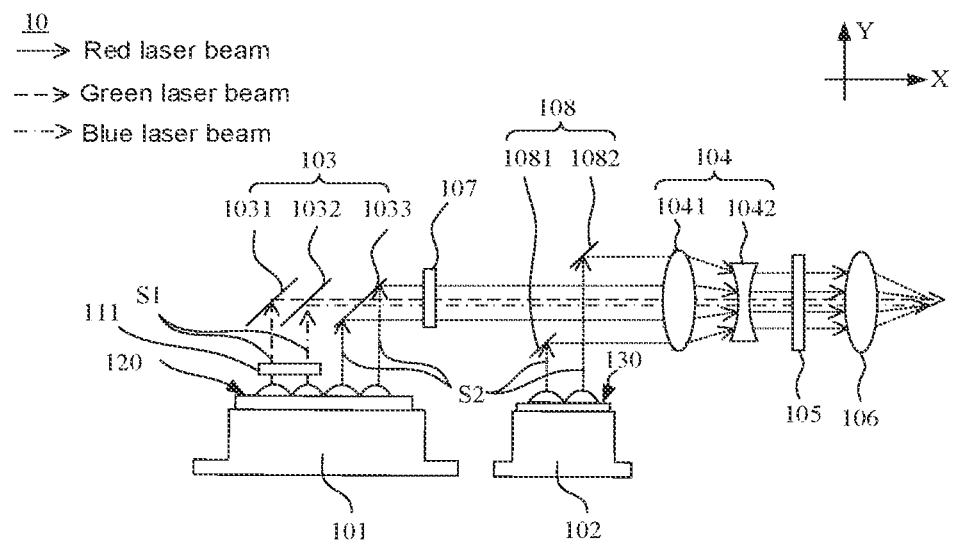
FIG. 14 is a diagram showing a structure of yet another laser source, in accordance with some embodiments.

FIG. 14 is a diagram showing a structure of yet another laser source, in accordance with some embodiments.

In some embodiments, as shown in FIG. 14, the laser source 10 further includes a first polarization conversion component 111. The first polarization conversion component 111 is configured to change the first polarization direction of the first type laser beam S1 (i.e., the green laser beam and the blue laser beam) incident on the first polarization conversion component 111 to the second polarization direction and propagate the first type laser beam S1 whose direction has changed to the first lens 1031 and the second lens 1032. The first polarization conversion component 111 is located between the laser-exit surface 120 of the first laser device 101 and the first lens 1031 and between the laser-exit surface 120 of the first laser device 101 and the second lens 1032. The first polarization conversion component 111 may be a half-wave plate.

On a plane (e.g., the laser-exit surface 120 of the first laser device 101) perpendicular to the second direction, an orthogonal projection of the first polarization conversion component 111 at least partially overlaps with the orthogonal projections of the first laser-exit region 121 and the second laser-exit region 122, so that the first type laser beam S1 emitted by the first laser device 101 may be incident on the first polarization conversion component 111.

On the plane perpendicular to the second direction, the orthogonal projections of the first lens 1031 and the second lens 1032 at least partially overlap with the orthogonal projection of the first polarization conversion component 111. In this way, the polarization direction of the first type laser beam S1 with the first polarization direction emitted by the first laser device 101 is changed by the first polarization conversion component 111 and then may be incident on the first lens 1031 and the second lens 1032. The first lens 1031 and the second lens 1032 reflect the first type laser beam S1 with the second polarization direction exiting from the first polarization conversion component 111 in the first direction.

For example, on the plane perpendicular to the second direction, the orthogonal projections of the first lens 1031 and the second lens 1032 overlap with the orthogonal projection of the first polarization conversion component 111. Alternatively, on the plane perpendicular to the second direction, the orthogonal projection of the first polarization conversion component 111 includes a portion of the orthogonal projection of the first lens 1031 and a portion of the orthogonal projection of the second lens 1032. Alternatively, an orthogonal projection of a region of the first polarization conversion component 111 receiving the first type laser beam S1 is located within the orthogonal projections of the first lens 1031 and the second lens 1032. The present disclosure is not limited thereto, as long as the first type laser beam S1 passing through the first polarization conversion component 111 may be incident on the first lens 1031 and the second lens 1032.

On the plane perpendicular to the second direction, the orthogonal projection of the third lens 1033 does not overlap with the orthogonal projection of the first polarization conversion component 111. In this way, the first laser device 101 may directly emit the second type laser beam S2 (i.e., the first red laser beam) to the third lens 1033, so as to prevent the polarization direction of the second type laser beam S2 from being changed when the second type laser beam S2 passes through the first polarization conversion component 111. The third lens 1033 reflects the second type laser beam S2 with the second polarization direction in the first direction.

In this way, the polarization direction of the laser beams exiting from all lenses of the first combining lens group 103 each are the second polarization direction.

The second laser device 102 directly emits the second type laser beam S2 with the second polarization direction toward the second combining lens group 108, and the second combining lens group 108 reflects the second type laser beam S2 in the first direction.

Therefore, the polarization direction of the first type laser beam S1 emitted by the first laser device 101 is changed from the first polarization direction to the second polarization direction after passing through the first polarization conversion component 111, and the polarization direction of the first type laser beam S1 whose polarization direction is changed is the same as the polarization direction of the second type laser beam S2 emitted by the first laser device 101 and the second laser device 102. That is, the polarization direction of the first type laser beam S1 whose polarization direction is changed is consistent with the polarization direction of the second type laser beam S2. In this way, the laser beams with the same polarization direction are used for forming the projection image, which may avoid a problem that the color blocks are in the formed projection image due to different transmissivities and reflectivities of the optical lens for the polarized light with different polarization directions.

Figure 15A:
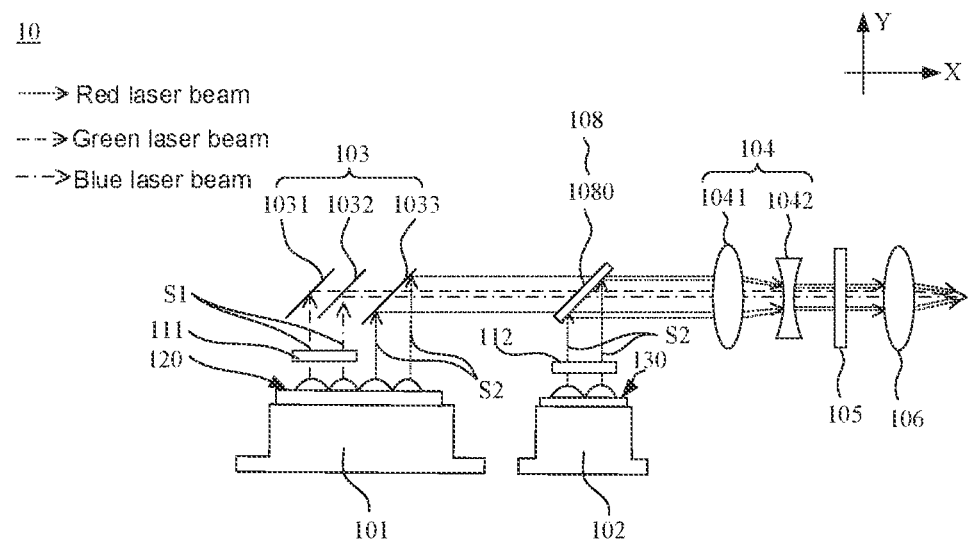
FIG. 15A is a diagram showing a structure of yet another laser source, in accordance with some embodiments.

FIG. 15A is a diagram showing a structure of yet another laser source, in accordance with some embodiments.

In some embodiments, as shown in FIG. 15A, the laser source 10 further includes a second polarization conversion component 112. The second polarization conversion component 112 is configured to change the polarization direction of the second type laser beam S2 (i.e. the second red laser beam) emitted by the second laser device 102 from the second polarization direction to the first polarization direction and propagate the changed laser beam to the second combining lens group 108. The second polarization conversion component 112 is located between the laser-exit surface 130 of the second laser device 102 and the second combining lens group 108. The second polarization conversion component 112 may be a half-wave plate.

On the plane (e.g., the laser-exit surface 130 of the second laser device 102) perpendicular to the second direction, an orthogonal projection of the second polarization conversion component 112 at least partially overlaps with an orthogonal projection of a laser-exit region of the second laser device 102, so that the second type laser beam S2 emitted by the second laser device 102 may be incident on the second polarization conversion component 112.

On the plane perpendicular to the second direction, the orthogonal projection of the lens of the second combining lens group 108 at least partially overlaps with the orthogonal projection of the second polarization conversion component 112. In this way, the polarization direction of the second type laser beam S2 (i.e., the second red laser beam) with the second polarization direction emitted by the second laser device 102 is changed by the second polarization conversion component 112 and then the second type laser beam whose polarization direction is changed by the second polarization conversion component 112 is incident on the second combining lens group 108. The second combining lens group 108 reflects the second type laser beam S2 with the first polarization direction exiting from the second polarization conversion component 112 in the first direction.

On the plane perpendicular to the first direction, the orthogonal projection of the second combining lens group 108 at least partially overlaps with the orthogonal projections of all lenses of the first combining lens group 103, so that the laser beams reflected by the first combining lens group 103 may be incident on the second combining lens group 108, and the laser beams reflected by the first combining lens group 103 may be combined with the second type laser beam S2 incident to the second combining lens group 108 from the second laser device 102. Here, the second combining lens group 108 is configured to reflect the second type laser beam S2 with the first polarization direction in the first direction and transmit the first type laser beam S1 with the second polarization direction and the second type laser beam S2 with the second polarization direction.

For example, on the plane perpendicular to the first direction, the orthogonal projection of the second combining lens group 108 overlaps with the orthogonal projections of all lenses of the first combining lens group 103. Alternatively, on the plane perpendicular to the first direction, the orthogonal projections of all lenses of the first combining lens group 103 are a portion of the orthogonal projection of the second combining lens group 108. Alternatively, on the plane perpendicular to the first direction, the orthogonal projection of a region of the first combining lens group 103 receiving the first type laser beam S1 and the orthogonal projection of a region of the first combining lens group 103 receiving the second type laser beam S2 are located within the orthogonal projection of the lens of the second combining lens group 108. The present disclosure is not limited thereto, as long as the first type laser beam S1 and the second type laser beam S2 reflected by the first combining lens group 103 may be incident on the second combining lens group 108.

Figure 16:
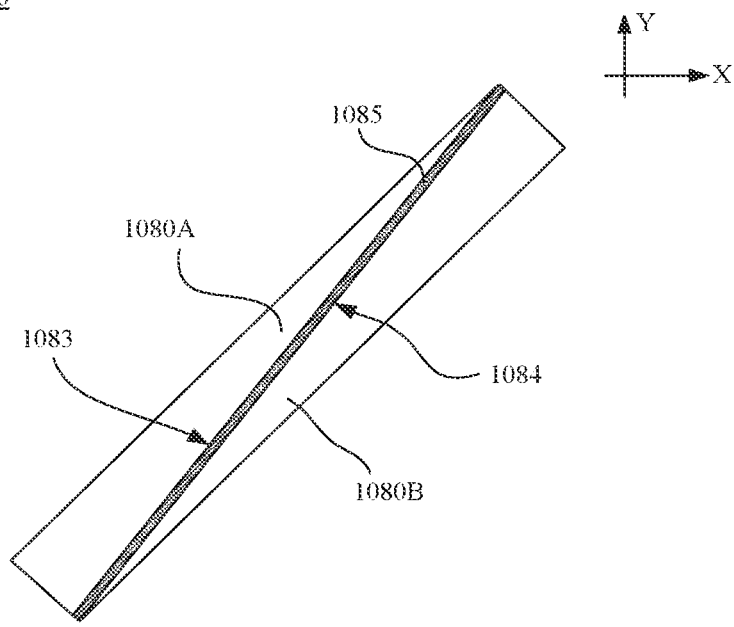
FIG. 16 is a diagram showing a structure of a second combining lens group in a laser source, in accordance with some embodiments.

The second combining lens group 108 may be a polarization beam splitter (PBS) 1080. FIG. 16 is a diagram showing a structure of a second combining lens group in a laser source, in accordance with some embodiments.

For example, as shown in FIG. 16, the polarization beam splitter 1080 is formed by connecting (e.g., bonding to) a pair of high-precision right-angle prisms (i.e., a first prism 1080A and a second prism 1080B). Surfaces (i.e., a first inclined surface 1083 and a second inclined surface 1084) where inclined sides of the two right-angle prisms are located are bonded to each other, and the surface where the inclined side of one of the two right-angle prisms is located is provided with a polarization beam splitting medium film 1085. The polarization beam splitter 1080 transmits the incident laser beam with the second polarization direction and reflects the incident laser beam with the first polarization direction at an exit angle of 45°.

The second type laser beam S2 emitted by the second laser device 102 is changed into the laser beam with the first polarization direction by the second polarization conversion component 112, and the polarization beam splitter 1080 may reflect the incident second type laser beam S2 with the first polarization direction at an exit angle of 45°, so that a transmission direction of the second type laser beam S2 may be changed to the first direction perpendicular to the second direction.

Moreover, the first combining lens group 103 reflects the first type laser beam S1 (the green laser beam and the blue laser beam) and the second type laser beam S2 (the first red laser beam) with the second polarization direction to the polarization beam splitter 1080 in the first direction, and the polarization beam splitter 1080 may transmit the first type laser beam S1 and the second type laser beam S2 in the first direction.

In this way, the second combining lens group 108 may combine the laser beams of three colors and propagate the combined laser beams in the first direction, so that the beam spots formed by the first type laser beam S1 and the second type laser beam S2 from the first laser device 101 on the second combining lens group 108 may overlap with the beam spot formed by the second type laser beam S2 from the second laser device 102.

In some embodiments of the present disclosure, by adjusting the polarization directions of the laser beams incident on the second combining lens group 108, the laser beams (i.e., the first type laser beam S1 and the second type laser beam S2) emitted by the first laser device 101 may be transmitted through the second combining lens group 108 and be combined with the second type laser beam S2 (e.g., the second red laser beam) reflected by the second combining lens group 108. In this way, it is possible to reduce the difference between the size of the beam spot formed by the first type laser beam S1 emitted by the first laser device 101 and the size of the beam spot formed by the second type laser beam S2 emitted by the second laser device 102, so as to improve the coincidence degree and the color uniformity of the beam spot formed by the combination of the first type laser beam S1 and the second type laser beam S2 and improve the display effect of the projection image.

In addition, the second combining lens group 108 may reflect the second type laser beam S2 with the first polarization direction in the first direction and transmit the first type laser beam S1 with the second polarization direction and the second type laser beam S2 with the second polarization direction. Therefore, it is possible to prevent the second combining lens group 108 from blocking the laser beams emitted by the first laser device 101 when the second combining lens group 108 is reflecting the second type laser beam S2 emitted by the second laser device 102 in the first direction. As a result, there is no need for the second combining lens group 108 to adopt two lenses to split the second type laser beam S2 emitted by the second laser device 102 into two separate laser beams, and there is also no need for providing the beam expanding component 107 to expand the first type laser beam S1.

In some embodiments, the beam contraction lens group 104 may be not disposed between the second combining lens group 108 and the converging lens 106, so as to reduce the number of optical elements in the laser projection apparatus 1 and reduce the volume of the laser projection apparatus 1. Moreover, by reducing the optical elements through which the laser beam passes, it is also possible to reduce the loss of the laser beams when the laser beams propagate through the optical elements and improve the optical efficiency of the laser projection apparatus 1.

Figure 15B:
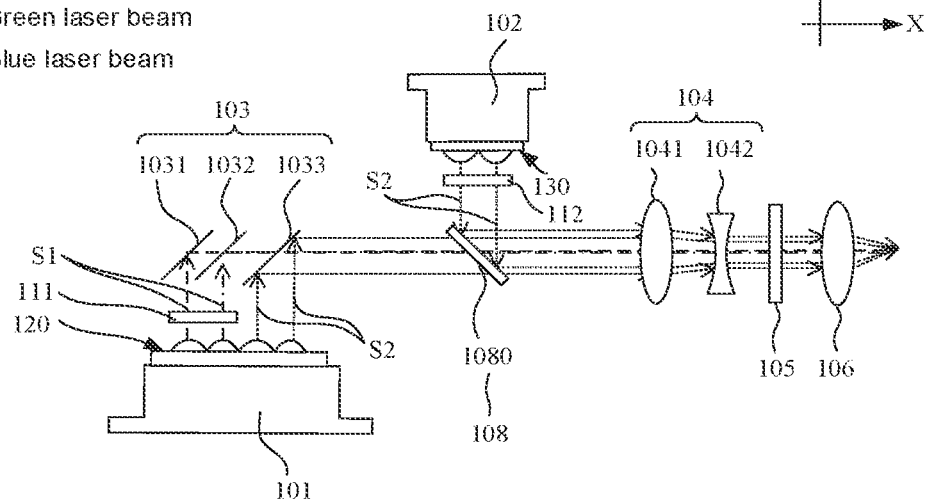
FIG. 15B is a diagram showing a structure of yet another laser source, in accordance with some embodiments.

FIG. 15A mainly illustrates an example in which an arrangement direction of the first laser device 101, the first polarization conversion component 111, and the first combining lens group 103 is the same as an arrangement direction of the second laser device 102, the second polarization conversion component 112, and the second combining lens group 108. However, the present disclosure is not limited thereto, and in some embodiments, as shown in FIG. 15B, the arrangement direction of the first laser device 101, the first polarization conversion component 111, and the first combining lens group 103 may also be opposite to the arrangement direction of the second laser device 102, the second polarization conversion component 112, and the second combining lens group 108.

The above description is mainly given by considering an example in which the laser source 10 includes the first polarization conversion component 111 and the second polarization conversion component 112. Of course, in some embodiments, the laser source 10 may also include one polarization conversion component.

The laser source 10 includes a third polarization conversion component. The third polarization conversion component is configured to change the polarization direction of the second type laser beam S2 emitted by the first laser device 101 from the second polarization direction to the first polarization direction and to propagate the laser beam with polarization direction changed to the first combining lens group 103. The third polarization conversion component is located between the laser-exit surface 120 of the first laser device 101 and the first combining lens group 103. The first combining lens group 103 may be a half-wave plate.

On the plane perpendicular to the second direction, an orthogonal projection of the third polarization conversion component at least partially overlaps with the orthogonal projection of the third laser-exit region 123 of the first laser device 101, so that the second type laser beam S2 emitted by the first laser device 101 may be incident on the third polarization conversion component. Moreover, on the plane perpendicular to the second direction, the orthogonal projection of the third lens 1033 at least partially overlaps with the orthogonal projection of the third polarization conversion component. In this way, the second type laser beam S2 with the second polarization direction emitted by the first laser device 101 may be incident on the third lens 1033 after the polarization direction of the second type laser beam S2 is changed by the third polarization conversion component. The third lens 1033 reflects the second type laser beam S2 with the first polarization direction exiting from the third polarization conversion component to the second combining lens group 108 in the first direction.

In this case, the second combining lens group 108 is configured to transmit the first type laser beam S1 and the second type laser beam S2 with the first polarization direction and to reflect the second type laser beam S2 with the second polarization direction. It will be noted that, the arrangement manner of the second combining lens group 108 and the first combining lens group 103 is similar to that described above, and details will not be repeated herein.

In this way, the second type laser beam S2 with the second polarization direction emitted by the second laser device 102 may be incident on the second combining lens group 108 and reflected by the second combining lens group 108 in the first direction. The first type laser beam S1 and the second type laser beam S2 with the first polarization direction from the first combining lens group 103 may be transmitted through the second combining lens group 108 in the first direction, so that the second combining lens group 108 may combine the laser beams of three colors and propagate the combined laser beams in the first direction. The beam spot formed by the first type laser beam S1 and the second type of laser beam S2 from the first laser device 101 on the second combining lens group 108 may overlap with the beam spot formed by the second type laser beam S2 from the second laser device 102, thereby improving the coincidence degree and color uniformity of the beam spot formed by the combination of the first type laser beam S1 and the second type laser beam S2 and improving the display effect of the projection image.

In addition, since a portion of the second type laser beam S2 may have the same polarization direction as the first type laser beam S1 after passing through the second combining lens group 108, it is also possible to reduce the speckle effect when the laser projection apparatus 1 performs projection display.

Figure 17A:
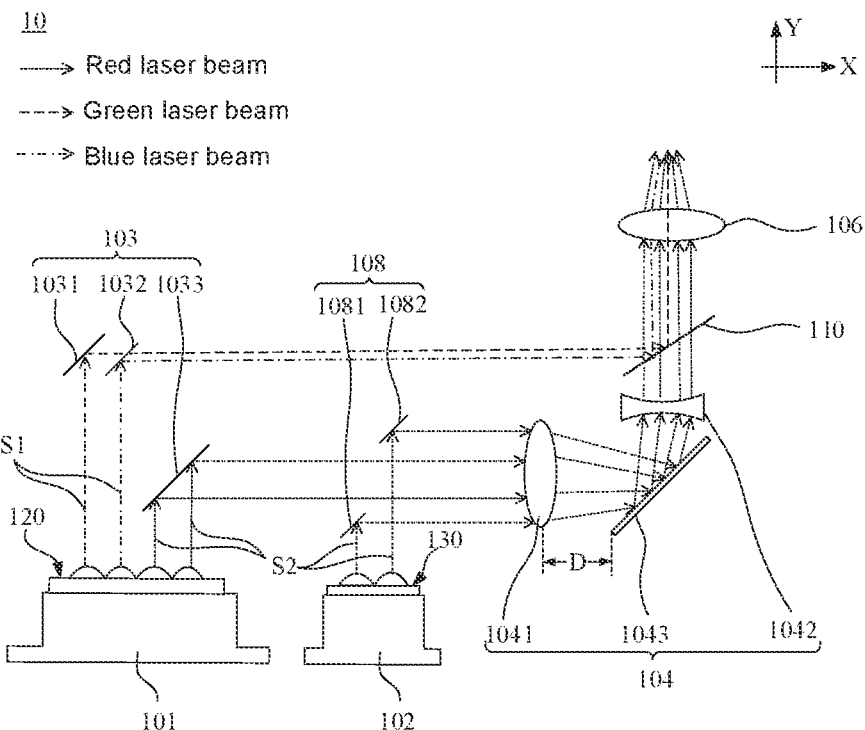
FIG. 17A is a diagram showing a structure of yet another laser source, in accordance with some embodiments.
Figure 17B:
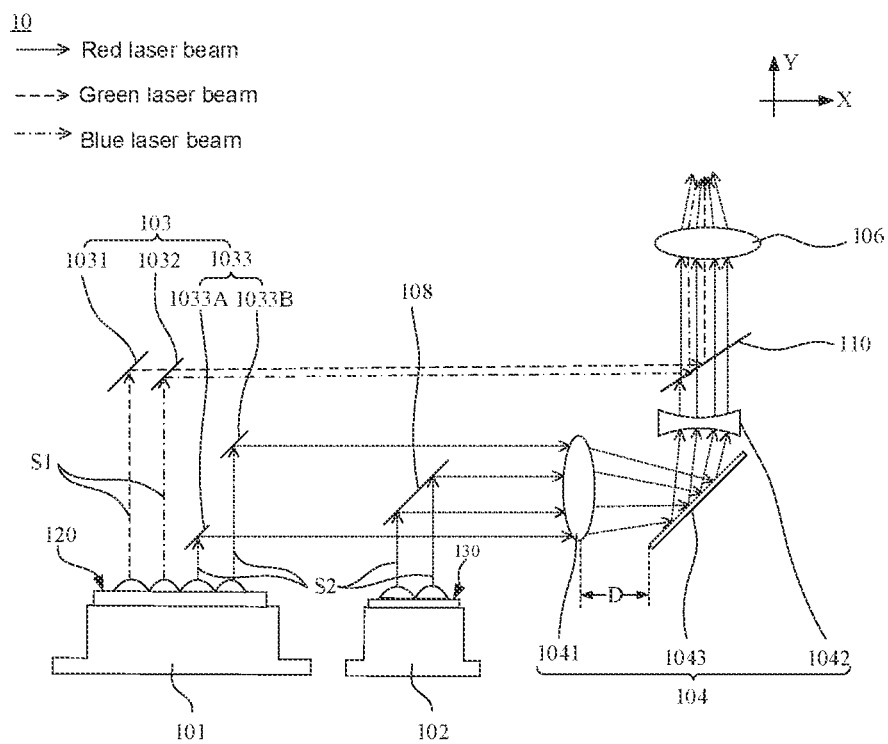
FIG. 17B is a diagram showing a structure of yet another laser device, in accordance with some embodiments.

FIG. 17A is a diagram showing a structure of yet another laser source, in accordance with some embodiments. FIG. 17B is a diagram showing a structure of yet another laser device, in accordance with some embodiments. The main difference between FIGS. 17A and 17B is that the third lens 1033 and the second combining lens group 108 have different structures.

The above description is mainly given by considering an example in which at least two of the orthogonal projection of the first lens 1031 (or the second lens 1032), the orthogonal projection of the third lens 1033, or the orthogonal projection of the lens of the second combining lens group 108 are overlapped with each other on the plane perpendicular to the first direction. Of course, in some embodiments, on the plane perpendicular to the first direction, the orthogonal projection of the first lens 1031 (or the second lens 1032), the orthogonal projection of the third lens 1033, and the orthogonal projection of the lens of the second combining lens group 108 may not overlap with (e.g., be separated from) each other.

For example, as shown in FIGS. 17A and 17B, on the plane perpendicular to the first direction, the orthogonal projection of the first lens 1031, the orthogonal projection of the second lens 1032, the orthogonal projection of the third lens 1033, and the orthogonal projections of the two lenses of the second combining lens group 108 do not overlap with each other.

In this case, in order to improve the color uniformity and the display effect of the projection image, as shown in FIGS. 17A and 17B, the laser source 10 further includes a third combining lens group 110. The third combining lens group 110 is configured to transmit the second type laser beam S2, reflect the first type laser beam S1 and propagate the second type laser beam S2 and the first type laser beam S1 to the beam outlet of the laser source 10. The third combining lens group 110 is located on the laser-exit side of beam contraction lens group 104 and on a laser-exit side of a first portion (e.g. the first lens 1031 and the second lens 1032) of the lenses of the first combining lens group 103. Here, the beam contraction lens group 104 contracts the second type laser beams S2 emitted by the first laser device 101 and the second laser device 102.

For example, the first portion (i.e., the first lens 1031 and the second lens 1032) of the lenses of the first combining lens group 103 receiving the first type laser beam S1 and the third combining lens group 110 are sequentially arranged in the first direction. A second portion (i.e., the third lens 1033) of the lenses of the first combining lens group 103 receiving the second type laser beam S2, the second combining lens group 108, and 37?the beam contraction lens group 104 are sequentially arranged in the first direction. Moreover, the first portion of the lenses of the first combining lens group 103 is farther away from the laser-exit surface 120 of the first laser device 101 than the second portion of the lenses of the first combining lens group 103.

The first combining lens group 103 reflects the incident first type laser beam S1 to the third combining lens group 110 in the first direction. The first combining lens group 103 reflects the incident second type laser beam S2 to the beam contraction lens group 104 in the first direction. The second combining lens group 108 reflects the incident second type laser beam S2 to the beam contraction lens group 104 in the first direction.

For example, the first lens 1031 reflects the incident green laser beam to the third combining lens group 110 in the first direction, the second lens 1032 reflects the incident blue laser beam to the third combining lens group 110 in the first direction, and the third lens 1033 reflects the incident first red laser beam to the beam contraction lens group 104 in the first direction. The second combining lens group 108 reflects the incident second red laser beam to the beam contraction lens group 104 in the first direction.

In some embodiments, as shown in FIGS. 17A and 17B, the beam contraction lens group 104 further includes a mirror 1043. The mirror 1043 is located in the Galileo telescopic formed by the convex lens 1041 and the concave lens 1042, and the mirror 1043 is configured to reflect the second type laser beams S2 (i.e. the first red laser beam and the second red laser beam) to the third combining lens group 110. In this way, the second type laser beams S2 (i.e., the red laser beam) may be incident on the third combining lens group 110 from a direction different from a propagation direction of the first type laser beam S1 (i.e., the blue laser beam and the green laser beam) through the mirror 1043.

In some embodiments, a position of the mirror 1043 may be adjustable, so as to change a position where the second type laser beams S2 are incident on the third combining lens group 110, thereby adjusting the coincidence degree of the beam spots of the laser beams of three colors.

For example, as shown in FIGS. 17A and 17B, by adjusting a distance D between the mirror 1043 and the convex lens 1041 of the beam contraction lens group 104, it is possible to adjust the positions where the second type laser beams S2 are incident on the third combining lens group 110.

In some embodiments, the third combining lens group 110 is a dichroic mirror. For example, the third combining lens group 110 reflects the blue laser beam and the green laser beam and transmits the red laser beam, so as to propagate the blue laser beam, the green laser beam and the red laser beam to the beam outlet of the laser source 10.

In some embodiments, the converging lens 106 and the third combining lens group 110 may be sequentially arranged in a direction opposite to the second direction. The laser beams of three colors are combined by the third combining lens group 110 and then are incident on the converging lens 106, so that the area of the combined beam spot may be further reduced, facilitating the beam collection of the subsequent beam path.

In some embodiments, referring to FIGS. 17A and 17B, the third lens 1033 includes one lens or two sub-lenses (the first sub-lens 1033A and the second sub-lens 1033B), and the second combining lens group 108 includes one lens or two lenses (the fourth lens 1081 and the fifth lens 1082). The orthogonal projection of the first lens 1031 (or the second lens 1032), the orthogonal projection of the third lens 1033, and the orthogonal projection of the lens of the second combining lens group 108 do not overlap with (e.g., are separated from) each other. Therefore, in a case where the third lens 1033 includes one lens, the second combining lens group 108 includes two lenses. Alternatively, in a case where the third lens 1033 includes two lenses, the second combining lens group 108 includes one lens. In this way, the beam path of the second type laser beam S2 emitted by the first laser device 101 does not overlap with (e.g., is separated from) the beam path of the second type laser beam S2 emitted by the second laser device 102. For convenience of description, the following description is mainly given by considering an example in which the first laser device 101 emits two first red laser beams, the third lens 1033 includes one lens, the second laser device 102 emits two second red laser beams, and the second combining lens group 108 includes two lenses. However, this will not be construed as a limitation to the present disclosure.

As shown in FIG. 17A, the beam path of the second type laser beam S2 (i.e., the first red laser beam) reflected by the third lens 1033 does not overlap with (e.g., is separated from) the beam paths of the two second type laser beams S2 (i.e., the second red laser beams) reflected by the two lenses of the second combining lens group 108, so as to prevent the two lenses of the second combining lens group 108 from blocking the first red laser beam reflected by the third lens 1033, thereby avoiding the loss of the laser beams and facilitating improving the luminance of the red laser beams formed by the first red laser beam and the second red laser beam.

A portion of the first type laser beam S1 (e.g., the green laser beam) is reflected by the first lens 1031 and then incident on the second lens 1032. The second lens 1032 is a dichroic mirror capable of transmitting the green laser beam and reflecting the blue laser beam. The second lens 1032 propagates the blue laser beam and the green laser beam to the third combining lens group 110 in the first direction. The beam paths of the blue laser beam and the green laser beam do not overlap with (e.g., are separated from) the beam paths of the first red laser beam and the second red laser beam. The blue laser beam and the green laser beam may directly incident on the third combining lens group 110 without passing through the beam contraction lens group 104.

It will be noted that, during the propagation process of the blue laser beam and the green laser beam, the blue laser beam and the green laser beam still have a certain divergence angle after being collimated. Therefore, after passing through a certain path of propagation, the divergence degree of the blue laser beam and the green laser beam increases with the extension of the beam path, so that the area of the beam spot of the blue laser beam and the green laser beam after combined on the third combining lens group 110 is increased. As a result, there is no need to provide the beam expanding component 107 for expanding the first type laser beam S1.

Moreover, since the first red laser beam and the second red laser beam each are contracted by the beam contraction lens group 104, the area of the beam spot of the red laser beam (i.e. the first red laser beam and the second red laser beam) is reduced. In this way, when the blue laser beam, the green laser beam, and the red laser beam are incident on the third combining lens group 110, although the divergence degree of the red laser beam on a fast axis and a slow axis is greater than the divergence degree of the blue laser beam and the divergence degree of the green laser beam, by reducing the area of the beam spot of the red laser beam and increasing the areas of the beam spots of the blue laser beam and the green laser beam, it is possible to reduce the difference of the areas of the beam spots of the laser beams with different colors, so as to improve the coincidence degree and the color uniformity of the beam spots after combined, thereby improving the display effect of the projection image.

In the above description of the embodiments, specific features, structures, materials, or characteristics may be combined in a suitable manner in any one or more embodiments or examples.

A person skilled in the art will understand that the scope of disclosure in the present disclosure is not limited to specific embodiments discussed above and may modify and substitute some elements of the embodiments without departing from the spirits of this application. The scope of this application is limited by the appended claims.

What is claimed is:

1. A laser source, comprising:
   a laser device including a first laser device and a second laser device, the first laser device being configured to emit a first type laser beam and a second type laser beam, and the second laser device being configured to emit at least the second type laser beam;
   a combining lens group including a first combining lens group and a second combining lens group, the first combining lens group being configured to combine the laser beams emitted by the first laser device and propagate the combined laser beams in a first direction, the second combining lens group being configured to reflect the second type laser beam emitted by the second laser device in the first direction; on a plane perpendicular to the first direction, an orthogonal projection of a beam spot provided by the first type laser beam on the first combining lens group being smaller than an orthogonal projection of a beam spot provided by the second type laser beam on the first combining lens group; and
   a beam spot angle guiding component, the beam spot angle guiding component being configured to change a divergence angle of at least one of the first type laser beam or the second type laser beam, so as to improve coincidence degree and color uniformity of the beam spot of the first type laser beam and the beam spot of the second type laser beam incident on the combining lens group.

2. The laser source according to claim 1, wherein the first laser device includes:
   a first laser-exit region configured to emit a laser beam of a first color;
   a second laser-exit region configured to emit a laser beam of a second color, and
   a third laser-exit region configured to emit a laser beam of a third color;
   wherein the first laser-exit region, the second laser-exit region and the third laser-exit region are sequentially arranged in the first direction, and the laser beam of the first color, the laser beam of second color and the laser beam of the third color are configured to be combined into a white laser beam; and
   the first type laser beam includes the laser beam of the first color and the laser beam of second color, and the second type laser beam includes the laser beam of the third color.

3. The laser source according to claim 2, wherein the first combining lens group is located on a laser-exit side of the first laser device, the second combining lens group is located on a laser-exit side of the second laser device, the first laser device and the first combining lens group are sequentially arranged in a second direction, and the second direction is perpendicular to the first direction; an arrangement direction of the second laser device and the second combining lens group is perpendicular to the first direction, the first combining lens group includes:
   a first lens configured to reflect the first type laser beam emitted by the first laser-exit region to a second lens in the first direction;
   the second lens configured to transmit the first type laser beam reflected by the first lens and reflect the first type laser beam emitted by the second laser-exit region in the first direction; and
   at least one third lens configured to reflect the second type laser beam emitted by the third laser-exit region in the first direction;
   wherein the first lens, the second lens and the third lens are sequentially arranged substantially in the first direction, and an orthogonal projection of the first lens overlaps with an orthogonal projection of the second lens on the plane perpendicular to the first direction.

4. The laser source according to claim 3, further comprising:
   a beam expanding component, the beam spot angle guiding component including the beam expanding component, the first combining lens group, the beam expanding component, and the second combining lens group being sequentially arranged in the first direction, and the beam expanding component being configured to increase the divergence angle of the first type laser beam;
   wherein a beam path of the second type laser beam reflected by the second combining lens group is separated from a beam path of the second type laser beam reflected by the first combining lens group.

5. The laser source according to claim 4, wherein the laser source satisfies one of the following:

the at least one third lens includes one third lens, the second combining lens group includes a fourth lens and a fifth lens, the fourth lens is closer to a laser-exit surface of the second laser device than the fifth lens, and on the plane perpendicular to the first direction, an orthogonal projection of the fourth lens and an orthogonal projection of the fifth lens are located on two sides of an orthogonal projection of the third lens, respectively; and the at least one third lens includes a first sub-lens and a second sub-lens, the first sub-lens is closer to a laser-exit surface of the first laser device than the second sub-lens, the second combining lens group includes one lens, and on the plane perpendicular to the first direction, an orthogonal projection of the first sub-lens and an orthogonal projection of the second sub-lens are located on two sides of an orthogonal projection of the second combining lens group, respectively.

6. The laser source according to claim 5, wherein on the plane perpendicular to the first direction, the orthogonal projections of the first lens and the second lens at least partially overlaps with the orthogonal projection of the third lens, and the orthogonal projection of the second combining lens group is separated from the orthogonal projections of the first lens and the second lens;

the third lens is further configured to transmit the first type laser beam exiting from the second lens in the first direction; and beam paths of the first type laser beam and the second type laser beam exiting from the beam expanding component each are separated from the beam path of the second type laser beam reflected by the second combining lens group.

7. The laser source according to claim 5, wherein on the plane perpendicular to the first direction, the orthogonal projection of the third lens is separated from the orthogonal projections of the first lens and the second lens, and the orthogonal projection of the lens of the second combining lens group at least partially overlaps with the orthogonal projections of the first lens and the second lens;

the second combining lens group is further configured to transmit the first type laser beam in the first direction; and beam paths of the first type laser beam and the second type laser beam exiting from the second combining lens group each are separated from the beam path of the second type laser beam exiting from the third lens.

8. The laser source according to claim 5, wherein a polarization direction of the first type laser beam emitted by the first laser device is a first polarization direction, polarization directions of the second type laser beams emitted by the first laser device and the second laser device are a second polarization direction, and the second polarization direction is perpendicular to the first polarization direction; and the laser source further comprises a first polarization conversion component, wherein the first polarization conversion component is located between the laser-exit surface of the first laser device and the first combining lens group, and the first polarization conversion component is configured to change the first polarization direction of the first type laser beam incident on the first polarization conversion component into the second polarization direction and propagate the laser beam with the changed polarization direction to the first lens and the second lens.

9. The laser source according to claim 8, wherein on a plane perpendicular to the second direction, the orthogonal projections of the first lens and the second lens at least partially overlaps with an orthogonal projection of the first polarization conversion component, and the orthogonal projection of the third lens is separated from the orthogonal projection of the first polarization conversion component.

10. The laser source according to claim 3, further comprising:

a beam contraction lens group located on a laser-exit path of the second combining lens group, the beam contraction lens group being configured to reduce the divergence angle of the second type laser beam incident on the beam contraction lens group;

the combining lens group further includes a third combining lens group, and the third combining lens group being configured to transmit the second type laser beam and reflect the first type laser beam;

wherein the beam spot angle guiding component includes the third combining lens group and the beam contraction lens group;

the third combining lens group is located on a laser-exit side of the beam contraction lens group and is located on a laser-exit side of a first portion of the lenses of the first combining lens group receiving the first type laser beam;

the first portion of the lenses of the first combining lens group and the third combining lens group are sequentially arranged in the first direction, a second portion of the lenses of the first combining lens group receiving the second type laser beam and the second combining lens group are sequentially arranged in the first direction, and the first portion of the lenses is farther away from a laser-exit surface of the first laser device than the second portion of the lenses; and a beam path of the second type laser beam emitted by the first laser device is separated from a beam path of the second type laser beam emitted by the second laser device.

11. The laser source according to claim 10, wherein on the plane perpendicular to the first direction, an orthogonal projection of the first portion of the lenses of the first combining lens group is separated from an orthogonal projection of the second portion of the lenses of the first combining lens group, and the orthogonal projections of the first portion and the second portion of the lenses of the first combining lens group are separated from an orthogonal projection of the second combining lens group.

12. The laser source according to claim 10, wherein the laser source satisfies one of the following:

the at least one third lens includes one third lens, the second combining lens group includes a fourth lens and a fifth lens, the fourth lens is closer to a laser-exit surface of the second laser device than the fifth lens, and on the plane perpendicular to the first direction, an orthogonal projection of the fourth lens and an orthogonal projection of the fifth lens are located on two sides of an orthogonal projection of the third lens, respectively; and the at least one third lens includes a first sub-lens and a second sub-lens, the first sub-lens is closer to the laser-exit surface of the first laser device than the second sub-lens, the second combining lens group includes one lens, and on the plane perpendicular to the first direction, an orthogonal projection of the first sub-lens and an orthogonal projection of the second sub-lens are located on two sides of an orthogonal projection of the second combining lens group, respectively.

13. The laser source according to claim 10, wherein the beam contraction lens group includes a mirror, the mirror is configured to reflect the incident second type laser beam to the third combining lens group.

14. A laser projection apparatus, comprising:
a laser source, the laser source being the laser source according to claim 1, and the laser source being configured to emit laser beams;
a light modulator, the light modulator being configured to modulate the laser beams incident on the light modulator according to an image signal, so as to obtain projection beams; and
a projection lens configured to project the projection beams to provide a projection image.

15. A laser source, comprising:
a laser device including a first laser device and a second laser device, the first laser device being configured to emit a first type laser beam and a second type laser beam, and the second laser device being configured to emit the second type laser beam;
a combining lens group including a first combining lens group and a second combining lens group, the first combining lens group being configured to combine the laser beams emitted by the first laser device and propagate the combined laser beams in a first direction, the second combining lens group being configured to reflect the second type laser beam from the second laser device in the first direction and transmit the first type laser beam and the second type laser beam from the first combining lens group; and
a polarization direction changing structure, the polarization direction changing structure being configured to change a polarization direction of at least one of the first type laser beam or the second type laser beam, so as to make a beam path of the second type laser beam emitted by the first laser device overlap with a beam path of the second type laser beam emitted by the second laser device;
wherein on a plane perpendicular to the first direction, an orthogonal projection of a beam spot provided by the first type laser beam on the first combining lens group is smaller than an orthogonal projection of a beam spot provided by the second type laser beam on the first combining lens group;
in the laser beams incident on the second combining lens group, the polarization directions of the first type laser beam and the second type laser beam from the first laser device are same, and the polarization directions of the first type laser beam and the second type laser beam from the first laser device are perpendicular to the polarization direction of the second type laser beam from the second laser device; and
on the second combining lens group, a beam spot provided by the first type laser beam and the second type laser beam from the first laser device overlaps with a beam spot provided by the second type laser beam from the second laser device.

16. The laser source according to claim 15, wherein the polarization direction of the first type laser beam emitted by the first laser device is a first polarization direction, the polarization directions of the second type laser beams emitted by the first laser device and the second laser device are a second polarization direction, the first polarization direction is perpendicular to the second polarization direction, and the polarization direction changing structure includes:
a first polarization conversion component located between a laser-exit surface of the first laser device and the first combining lens group, and the first polarization conversion component being configured to change the polarization direction of the first type laser beam incident on the first polarization conversion component from the first polarization direction to the second polarization direction and propagate the laser beam with the changed polarization direction to the first combining lens group; and
a second polarization conversion component located between a laser-exit surface of the second laser device and the second combining lens group, the second polarization conversion component being configured to change the polarization direction of the second type laser beam incident on the second polarization conversion component from the second polarization direction to the first polarization direction and propagate the laser beam with the changed polarization direction to the second combining lens group.

17. The laser source according to claim 16, wherein the first laser device includes:
a first laser-exit region configured to emit a laser beam of a first color;
a second laser-exit region configured to emit a laser beam of a second color;
a third laser-exit region configured to emit a laser beam of a third color;
wherein the first laser-exit region, the second laser-exit region and the third laser-exit region are sequentially arranged in the first direction, and the laser beam of the first color, the laser beam of the second color, and the laser beam of the third color are configured to be combined into a white laser beam; and
the first type laser beam includes the laser beam of the first color and the laser beam of the second color, and the second type laser beam includes the laser beam of the third color.

18. The laser source according to claim 17, wherein the first combining lens group is located on a laser-exit side of the first laser device, the second combining lens group is located on a laser-exit side of the second laser device, the first laser device and the first combining lens group are sequentially arranged in a second direction, and the second direction is perpendicular to the first direction; an arrangement direction of the second laser device and the second combining lens group is perpendicular to the first direction, the first combining lens group includes:
a first lens configured to reflect the first type laser beam emitted by the first laser-exit region to a second lens in the first direction;
the second lens configured to transmit the first type laser beam reflected by the first lens in the first direction and reflect the first type laser beam emitted by the second laser-exit region; and
a third lens configured to reflect the second type laser beam emitted by the third laser-exit region and transmit the first type laser beam exiting from the second lens in the first direction;
wherein the first lens, the second lens and the third lens are sequentially arranged substantially in the first direction, and on the plane perpendicular to the first direction, an orthogonal projection of the first lens overlaps with an orthogonal projection of the second lens.

19. The laser source according to claim 17, wherein on a plane perpendicular to the second direction, the orthogonal projections of the first lens and the second lens of the first combining lens group at least partially overlaps with an orthogonal projection of the first polarization conversion component, and an orthogonal projection of the third lens of the first combining lens group is separated from the orthogonal projection of the first polarization conversion component; and on the plane perpendicular to the second direction, an orthogonal projection of the second combining lens group at least partially overlaps with an orthogonal projection of the second polarization conversion component.

20. The laser source according to claim 15, wherein on the plane perpendicular to the first direction, an orthogonal projection of the second combining lens group overlaps with an orthogonal projection of the first combining lens group.

\* \* \* \* \*